United States Patent
Toyoda et al.

[19]

[11] Patent Number: 5,882,804
[45] Date of Patent: Mar. 16, 1999

[54] SLIDE SURFACE CONSTRUCTION

[75] Inventors: Yusuke Toyoda; Masamune Tabata; Kenji Dosaka; Takahiro Gunji, all of Saitama, Japan

[73] Assignee: Honda Giken Kogyo Kabushiki Kaisha, Tokyo, Japan

[21] Appl. No.: 609,444

[22] Filed: Mar. 1, 1996

[30] Foreign Application Priority Data

Mar. 1, 1995 [JP] Japan .................................. 7-066902
Mar. 3, 1995 [JP] Japan .................................. 7-070541

[51] Int. Cl.$^6$ .............................. B32B 3/12; B32B 15/01; B32B 33/00
[52] U.S. Cl. ...................... 428/687; 428/639; 428/935; 428/681; 148/400; 384/912
[58] Field of Search ................................. 428/687, 681, 428/935, 639; 384/912; 277/236, 235 A; 123/193.6; 148/320, 318, 319, 400

[56] References Cited

U.S. PATENT DOCUMENTS

| | | | |
|---|---|---|---|
| 5,310,606 | 5/1994 | Fujisawa et al. | 428/645 |
| 5,320,912 | 6/1994 | Fujisawa et al. | 428/687 |
| 5,322,742 | 6/1994 | Fujisawa et al. | 428/687 |
| 5,322,743 | 6/1994 | Fujisawa et al. | 428/687 |
| 5,324,596 | 6/1994 | Fujisawa et al. | 428/687 |
| 5,340,660 | 8/1994 | Fujisawa et al. | 428/687 |
| 5,342,698 | 8/1994 | Fujisawa et al. | 428/612 |
| 5,376,194 | 12/1994 | Gunji et al. | 148/426 |
| 5,401,585 | 3/1995 | Fujisawa et al. | 428/653 |
| 5,427,633 | 6/1995 | Fujisawa et al. | 148/320 |
| 5,443,919 | 8/1995 | Fujisawa et al. | 428/687 |
| 5,443,920 | 8/1995 | Fujisawa et al. | 428/687 |
| 5,445,684 | 8/1995 | Gunji et al. | 148/320 |
| 5,468,567 | 11/1995 | Fujisawa et al. | 428/645 |
| 5,503,942 | 4/1996 | Tabata et al. | 428/687 |
| 5,547,771 | 8/1996 | Gunji et al. | 428/687 |
| 5,597,657 | 1/1997 | Gunji et al. | 428/680 |

FOREIGN PATENT DOCUMENTS

| | | |
|---|---|---|
| 0 376 368 A2 | 12/1989 | European Pat. Off. . |
| 2320524 | 4/1973 | Germany . |
| 6174089 | 6/1994 | Japan . |

OTHER PUBLICATIONS

Translation of French Preliminary Search Report (no date).
Patent Abstract of JP 6174089 (Jun. 21, 1994).
Patent Abstract of JP 5009789 (Jan. 1993).
French Preliminary Search Report (in French), with 23 Jul. 1997 as date the search conducted.
Abstract (in English), *Wear Resistant, High Boron, Sintered Alloy*, Kokai No. 52–50910, Appl. No. 50–127606 (Apr. 1977).

*Primary Examiner*—John J. Zimmerman
*Assistant Examiner*—Michael LaVilla
*Attorney, Agent, or Firm*—Lyon & Lyon LLP

[57] ABSTRACT

A slide surface construction is formed of an aggregate of metal crystals on a surface of a slide member. The area rate A of pyramid-shaped metal crystals in the slide surface is in the range of $A \geq 40\%$, and the oxygen (O) content and/or the phosphorous (P) content in the aggregate is in a range of $0 \geq 0.2\%$ by weight and $P \geq 0.04\%$ by weight. The slide surface takes on an intricate aspect due to the presence of the large number of hexagonal pyramid-shaped metal crystals and hence, has a good oil retention. In addition, the wearing of the hexagonal pyramid-shaped metal crystals is inhibited by an increase in hardness caused by the oxygen contained, and therefore, the oil retention is maintained. Thus, the slide surface construction exhibits an excellent seizure resistance. In addition to oxygen (O) and/or phosphorous (P), the elements that may be added to the aggregate include hydrogen (H), carbon (C) and boron (B).

17 Claims, 24 Drawing Sheets

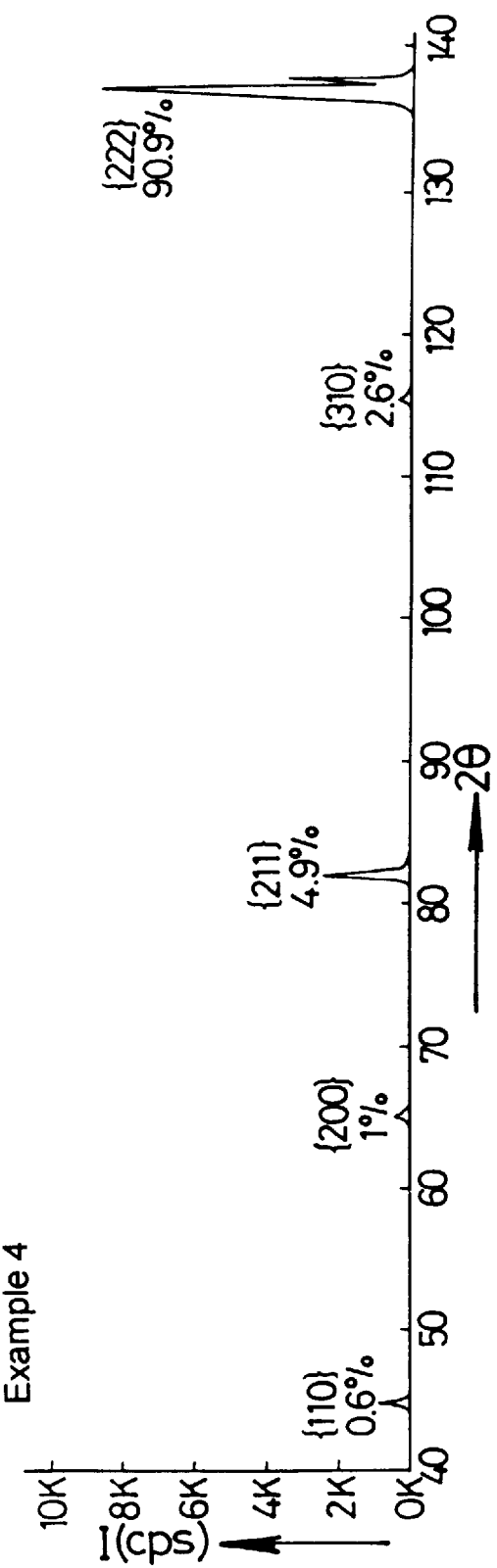

SLIDE SURFACE CONSTRUCTION

BACKGROUND OF THE INVENTION

1. Field of the Invention

The present invention relates to a slide surface construction, and particularly, to a slide surface construction formed of an aggregate of metal crystals and having a high hardness.

2. Description of the Related Art

Such conventionally known slide surface constructions include an Fe-plated layer, for example, which is provided on outer peripheral surfaces of a land portion and a skirt portion of a substrate made of a steel in a piston for an internal combustion engine for the purpose of providing an enhancement in wear resistance.

However, the known slide surface construction has a problem that under existing circumstances where speed and output of the internal combustion engine have tended to increase, the known slide surface construction is not sufficient in oil retaining property, namely, oil retention and is poor in seizure resistance due to a relatively smooth slide surface thereof.

Therefore, the present applicant has proposed a slide surface construction including a large number of pyramid-shaped metal crystals in a slide surface thereof (for example, see Japanese Patent Application Laid-open No.174089/94).

If the slide surface construction is formed in this manner, adjacent pyramid-shaped metal crystals assume mutually biting states and hence, the slide surface takes on an intricate aspect comprising a large number of fine crests, a large number of fine valleys formed between the crests, and a large number of fine swamps formed due to the mutual biting of the crests. Therefore, the slide surface construction has a good oil retention. Thus, the seizure resistance of the slide surface construction is enhanced.

However, as a result of various reviews of the slide surface construction, it has been made clear that the slide surface construction has a relatively low hardness and hence, in order to accommodate a more severe sliding environment, it is necessary to enhance the hardness of the slide surface construction to inhibit or resist the wearing of the pyramid-shaped metal crystals in such sliding environment, thereby allowing the slide surface construction to maintain a good oil retention.

SUMMARY OF THE INVENTION

It is an object of the present invention to provide a slide surface construction of the above-described type, which has a high hardness, whereby the wearing of the pyramid-shaped metal crystals can be inhibited in a severer sliding environment, thereby maintaining a good oil retention.

To achieve the above object, according to the present invention, there is provided a slide surface construction, which is formed of an aggregate of metal crystals, wherein the area rate A of pyramid-shaped metal crystals in a slide surface is in a range of $A \geq 40\%$, and the aggregate contains at least one of oxygen (O) and phosphorus (P), the O content being in a range of $O \geq 0.2\%$ by weight, and the P content being in a range of $P \geq 0.04\%$ by weight.

If the area rate A of pyramid-shaped metal crystals is set in the above-described range, the adjacent pyramid-shaped metal crystals assume mutually biting states. Therefore, the slide surface takes on an intricate aspect comprising a large number of fine crests, a large number of fine valleys formed between the crests, and a large number of fine swamps formed due to the mutual biting of the crests.

If the content of O (oxygen) and/or P (phosphorus) in the aggregate is set in the above-described range, the hardness of the slide surface construction can be enhanced substantially.

In such a slide surface construction, the wearing of the pyramid-shaped metal crystals is inhibited or resisted, even if the slide surface construction is placed in a severe sliding environment. Therefore, under lubrication, the oil retention of the slide surface construction is maintained satisfactorily and under non-lubrication the dispersion of a sliding load is provided by the large number of fine pyramid-shaped metal crystals. Thus, the slide surface construction exhibits an excellent seizure resistance under both lubrication and non-lubrication.

If the area rate A of the pyramid-shaped metal crystals is lower than 40%, the slide surface tends to be simplified and hence, such area rate A lower than 40% is undesirable. If the O content is lower than 0.2% by weight and/or the P content is lower than 0.04% by weight, the degree of enhancement in hardness of the slide surface construction is lowered. On the other hand, it is desirable that the upper limit of the O content is equal to 22.9% by weight. If the O content is higher than 22.9% by weight, a wustite is liable to be produced. If the wustite is produced and segregated at a grain boundary, the strength of the slide surface construction is lowered.

It is desirable that the upper limit of the P content is equal to 11.5% by weight. If the P content is higher than 11.5% by weight, a metal phosphide, $Fe_3P$ is produced in an increased amount. For this reason, the metal crystals are liable to be granulated in the slide surface, and the strength of the slide surface construction is lowered due to the grain boundary segregation of $Fe_3P$.

In addition, according to the present invention, there is provided a slide surface construction, which is formed of an aggregate of metal crystals, wherein the area rate A of pyramid-shaped metal crystals in a slide surface is in a range of $A \geq 40\%$, and the aggregate contains at least one of oxygen (O) and phosphorus (P) and at least one of hydrogen (H) and carbon (C), the O content being in a range of $O \geq 0.2\%$ by weight, the P content being in a range of $P \geq 0.04\%$ by weight, the H content being in a range of $H \geq 0.01\%$ by weight, and the C content being in a range of $C \geq 0.03\%$ by weight.

If a particular amount of hydrogen (H) and/or a particular amount of carbon (C) are (is) contained in the slide surface construction along with oxygen (O) and phosphorus (P), the seizure resistance of the slide surface construction can be further enhanced. This is due to a reason which will be described below.

If the content of H in the aggregate is set in the above-described range, the hardness of the pyramid-shaped metal crystals can be enhanced, and at least some of the hydrogen (H) contained in the aggregate can be incorporated in the pyramid-shaped metal crystals.

When such slide surface construction is slid, the plastic deformation of tip ends of the pyramid-shaped metal crystals is avoided, and the tip ends of the pyramid-shaped metal crystals are sheared and worn in a direction intersecting a direction of the height due to a brittleness caused by the hydrogen (H) contained in the pyramid-shaped metal crystals. As a result, the oil retention by the valleys is insured, and the surface-on-surface sliding is permitted to occur, leading to a reduced friction coefficient. Thus, the slide surface construction exhibits an excellent sliding characteristic.

If the H content is lower than 0.01% by weight, the degree of enhancement in hardness of the pyramid-shaped metal crystals is lowered. In addition, the amount of H incorporated in the pyramid-shaped metal crystal is decreased and hence, the above-described shearing is not caused. On the other hand, it is desirable that the upper limit of the H content is equal to 0.1% by weight. If the H content is higher than 0.1% by weight, the hardness HmV of the slide surface construction is equal to or higher than 900 and for this reason, the slide surface construction is liable to be cracked.

If the content of C in the aggregate is set in the above-described range, the hardness of the slide surface construction can be enhanced substantially.

If the C content is lower than 0.03% by weight, the degree of enhancement in hardness of the slide surface construction is lowered. On the other hand, it is desirable that the upper limit of the C content is equal to 0.8% by weight. If the C content is higher than 0.8% by weight, it is difficult to form the metal crystals into the pyramid shape in the slide surface.

Further, according to the present invention, there is provided a slide surface construction, which is formed of an aggregate of metal crystals, wherein the aggregate has a large number of columnar metal crystals which are grown from a substrate and whose tip ends are formed of pyramid-shaped metal crystals, the area rate A of the pyramid-shaped metal crystals in a slide surface being in a range of A≧40%, and the aggregate contains boron (B), and at least one of oxygen (O) and phosphorus (P), or contains boron (B) and at least one of oxygen (O) and phosphorus (P) and at least one of hydrogen (H) and oxygen (O), the B content being in a range of B≧0.01% by weight, the O content being in a range of O≧0.2% by weight, the P content being in a range of P≧0.04% by weight, the H content being in a range of H≧0.01% by weight, and the C content being in a range of C≧0.03% by weight.

In the above feature of the present invention, the functions and effects of oxygen (O), phosphorus (P), hydrogen (H) and carbon (C) are as described above. The function and effect of boron (B) is as follows.

If a particular amount of B is contained in the aggregate, as described above, boron (B) is preferentially precipitated in a grain boundary between adjacent columnar metal crystals to reinforce the grain boundary. In addition, the diametrical growth of the adjacent columnar metal crystals is inhibited by the preferential precipitation of B in the grain boundary and hence, these columnar metal crystals are finely divided, resulting in an enhanced hardness of the slide surface construction. In this manner, the enhancement in hardness of the slide surface construction is achieved.

However, if the B content is lower than 0.01% by weight, the ability to reinforce the grain boundary and the ability to inhibit the diametrical growth are lowered and for this reason, it is impossible to enhance the hardness of the slide surface construction. It is desirable that the upper limit of the B content is equal to 3.7% by weight. If the B content is higher than 3.7% by weight, a B-based intermetallic compound is liable to be precipitated in the grain boundary. If such B-based intermetallic compound is precipitated, the resulting slide surface construction has a reduced strength.

The slide surface construction formed with the area rate A of the pyramid-shaped metal crystals, the added elements and the contents of these elements being specified, exhibits an excellent sliding characteristic in a severe sliding environment such as under a high surface pressure or the like.

The above and other objects, features and advantages of the invention will become apparent from the following detailed description of the preferred embodiments taken in conjunction with the accompanying drawings.

BRIEF DESCRIPTION OF THE DRAWINGS

FIG. 10 is an X-ray diffraction pattern for an example 4;

DETAILED DESCRIPTION OF THE PREFERRED EMBODIMENTS

Figure 1:
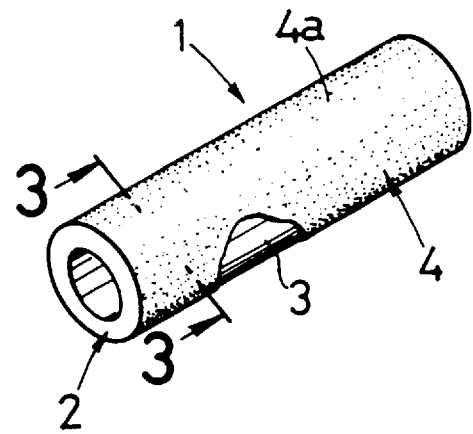
FIG. 1 is a broken-away perspective view of an essential portion of a piston pin.

Referring to FIG. 1, a piston pin 1 for an internal combustion engine includes a pipe-like substrate 2 made of a steel. A lamellar slide surface construction 4 is formed on an outer peripheral surface 3 of the substrate 2 by plating.

Figure 2:
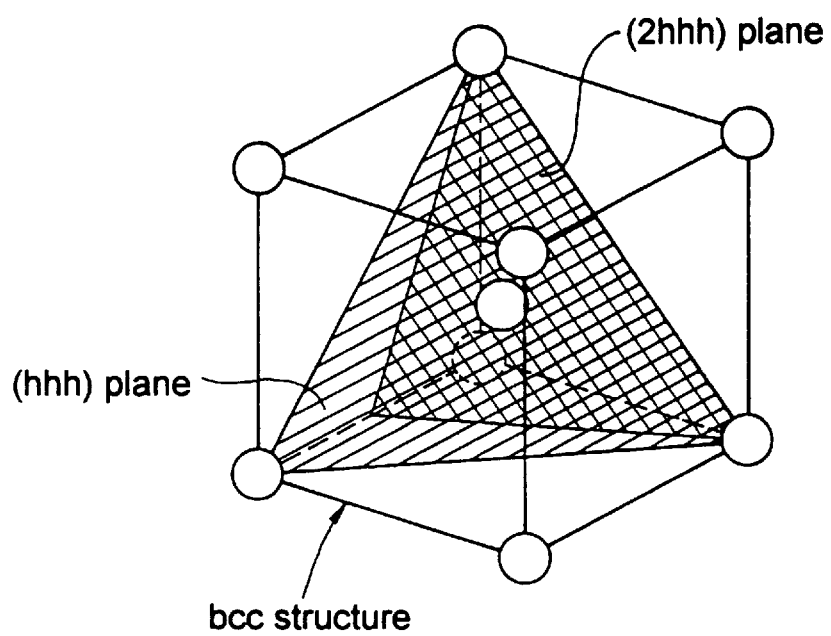
FIG. 2 is a perspective view of a body-centered cubic structure and its (hhh) plane and (2hhh) plane.
Figure 3:
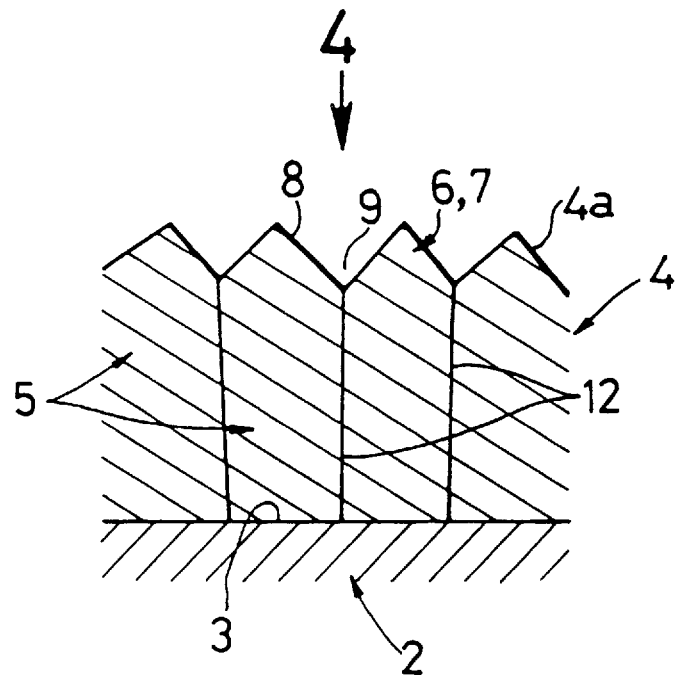
FIG. 3 is an enlarged sectional view taken along a line 3—3 in FIG. 1.

The slide surface construction 4 is formed of an aggregate of metal crystals having a body-centered cubic structure (a bcc structure) as shown in FIG. 2 in the illustrated embodiment. The aggregate includes a large number of columnar metal crystals 5 which are grown from the substrate 2, as shown in FIG. 3. Each of the columnar metal crystals 5 is at least one of an (hhh) oriented metal crystal with its (hhh) plane (by Miller indices) oriented toward a slide surface 4a, or a (2hhh) oriented metal crystal with its (2hhh) planes (by Miller indices) oriented toward the slide surface 4a.

Figure 4:
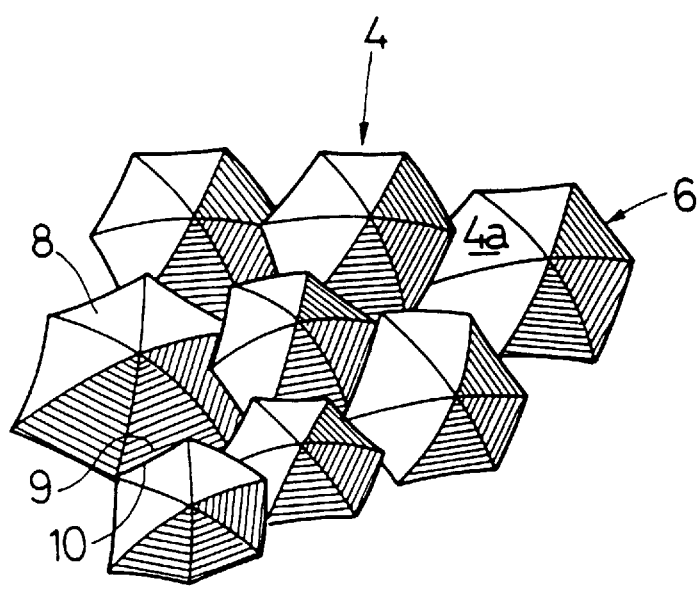
FIG. 4 is a view taken along an arrow 4 in FIG. 3.
Figure 5:
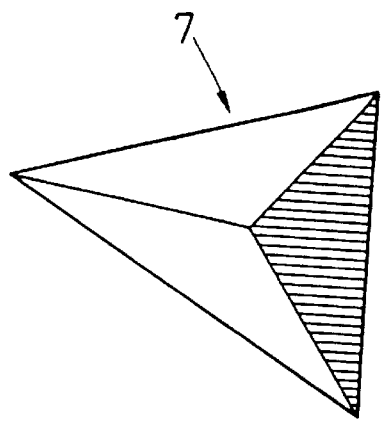
FIG. 5 is a plan view of a trigonal pyramid-shaped metal crystal.

When the columnar metal crystal 5 is the (hhh) oriented metal crystal, tip ends of the columnar metal crystals 5 can be formed into hexagonal pyramid-shaped metal crystals 6 as shown in FIG. 4, or trigonal pyramid-shaped metal crystals 7 as shown in FIG. 5 in the slide surface 4a. The hexagonal pyramid-shaped metal crystals 6 are small in average grain size and substantially uniform in grain size, as compared with the trigonal pyramid-shaped metal crystals 7. In the hexagonal pyramid-shaped metal crystals 6 or the like, there is an interrelation between the grain size and the height and hence, the grain sizes are uniform, which indicates that the heights are substantially equal to one another.

When the columnar metal crystal 5 is the (2hhh) oriented metal crystal, tip ends of the columnar metal crystals 5 can be formed into small pyramid-shaped metal crystals.

The area rate A of the pyramid-shaped metal crystals such as hexagonal and trigonal pyramid-shaped metal crystals 6 and 7 and the small pyramid-shaped metal crystals is set in a range of $A \geq 40\%$ (including $A \geq 100\%$).

If the area rate A is set in such range, for example, the hexagonal pyramid-shaped metal crystals 6 are formed into states with adjacent ones biting into each other, as shown in FIG. 4. Thus, the slide surface 4a has an enlarged surface area, as compared with a slide surface formed of trigonal pyramid-shaped metal crystals 7, and takes on a very intricate aspect comprising a large number of extremely fine crests 8, a large number of extremely fine valleys 9 formed between the crests 8, and a large number of extremely fine swamps 10 formed due to mutual biting of the crests 8.

The aggregate contains oxygen (O) and/or phosphorus (P). The O content is set in a range of $O \geq 0.2\%$ by weight, and the P content is set in a range of $P \geq 0.04\%$ by weight. If the O content and/or the P content are set in such range, the hardness of the slide surface construction can be enhanced substantially.

In such slide surface construction 4, the wearing of the hexagonal pyramid-shaped metal crystals can be inhibited even if the slide surface construction 4 is put under a severe sliding environment. Therefore, under lubrication the oil retention of the slide surface construction 4 is maintained and under non-lubrication the dispersion of a sliding load is provided by the infinite number of extremely fine hexagonal pyramid-shaped metal crystals 6. Thus, the slide surface construction 4 exhibits an excellent seizure resistance both under lubrication and under non-lubrication.

Further, as a result of uniform fine division of the hexagonal pyramid-shaped metal crystals 6, a local increase in surface pressure can be avoided, and the fine division of the sliding load can be achieved. Thus, the slide surface construction 4 exhibits an excellent wear resistance not only under lubrication but also under non-lubrication.

The aggregate may contain oxygen (O) and/or phosphorus (P), and hydrogen (H) and/or carbon (C) for purpose of providing a function and effect similar to those described above. In this case, the O content is in a range of $O \geq 0.2\%$ by weight; the P content is in a range of $P \geq 0.04\%$ by weight; the H content is in a range of $O \geq 0.01\%$ by weight; and the C content is in a range of $O \geq 0.03\%$ by weight.

Further, the aggregate may contain oxygen (O) and/or phosphorus (P), and boron (B), or may contain (O) and/or phosphorus (P), boron (B), and hydrogen (H) and/or carbon (C) for purpose of providing a function and effect similar to those described above. In this case, the O content is in a range of $O \geq 2\%$ by weight; the P content is in a range of $\geq 0.04\%$ by weight; the B content is in a range of $B \geq 0.01\%$ by weight; the H content is in a range of $O \geq 0.01\%$ by weight; and the C content is in a range of $O \geq 0.03\%$ by weight.

If the H content in the aggregate is set in such range, the hardness of the hexagonal pyramid-shaped metal crystals 6 and the like can be enhanced, and at least some of the hydrogen (H) contained in the aggregate can be incorporated in the hexagonal pyramid-shaped metal crystals 6 and the like.

When such slide surface construction 4 is slid, the plastic deformation of tip ends of the hexagonal pyramid-shaped metal crystals 6 and the like can be avoided, and the tip ends of the hexagonal pyramid-shaped metal crystals 6 and the like are sheared and worn in a direction intersecting a direction of the height due to a brittleness caused by the incorporation of hydrogen in the hexagonal pyramid-shaped metal crystals 6 and the like. As a result, the oil retention by the valleys 9 is insured, and the surface-on-surface sliding is permitted to occur, leading to a reduced friction coefficient. Thus, the slide surface construction exhibits an excellent sliding characteristic.

Figure 6:
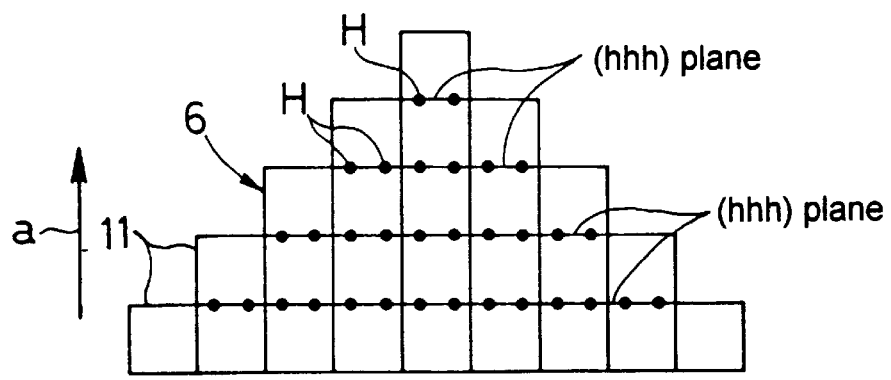
FIG. 6 is a diagrammatic illustration of a model of the trigonal pyramid-shaped metal crystal.
Figure 7:
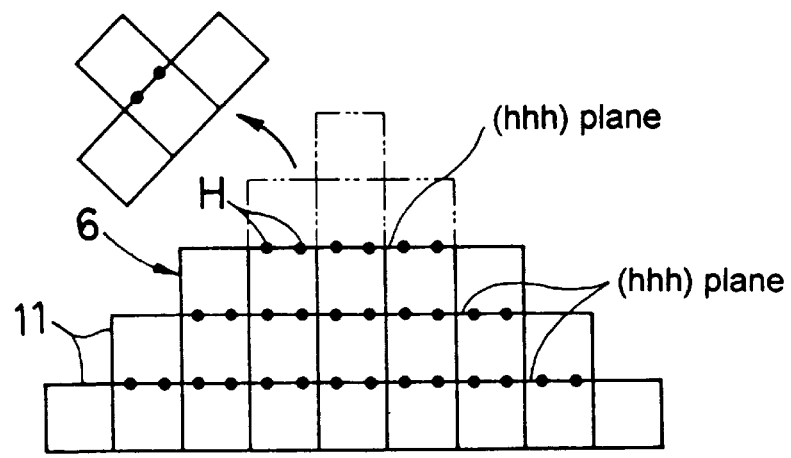
FIG. 7 is a diagrammatic illustration of the model for explaining the wearing of the pyramid-shaped metal crystal.

One of the reasons why the shearing occurs is that a phenomenon which will be described below can be presumed from the photomicrograph showing the crystal structure of the vertical section of the slide surface construction after a sliding test. For example, it is believed that the hexagonal pyramid-shaped metal crystal 6 has a structure in which a large number of cubic lattices 11 are stacked one on another, as shown in FIG. 6, and at least some of the hydrogen exists on a crystal plane which is in a relation intersecting (at a right angle in the illustrated embodiment) the direction of the height within the hexagonal pyramid-shaped metal crystal 6, i.e., an (hhh) plane and hence, when the slide surface construction is slid, the tip ends of the hexagonal pyramid-shaped metal crystals 6 are sheared at a preselected (hhh) plane, as shown in FIG. 7. In this case, because the (hhh) plane is a crystal plane having a high surface energy, a smooth plane produced by the shearing has a good wettability to oil and hence, an oil film is immediately formed on the slide surface 4a after being worn.

If the C content in the aggregate is set in the above-described range, the hardness of the slide surface construction 4 can be enhanced substantially.

If the B content in the aggregate is set in the above-described range, boron is preferentially precipitated in a grain boundary 12 (see FIG. 3) between the adjacent columnar metal crystals 5 to reinforce the grain boundary 12. In addition, the diametrical growth of the adjacent columnar metal crystals 5 is inhibited by the preferential growth of the boron in the grain boundary 12. Therefore, the columnar metal crystals 5 are finely divided, resulting in an enhanced hardness of the slide surface construction. In this manner, the enhancement in hardness of the slide surface construction is achieved.

Figure 8:
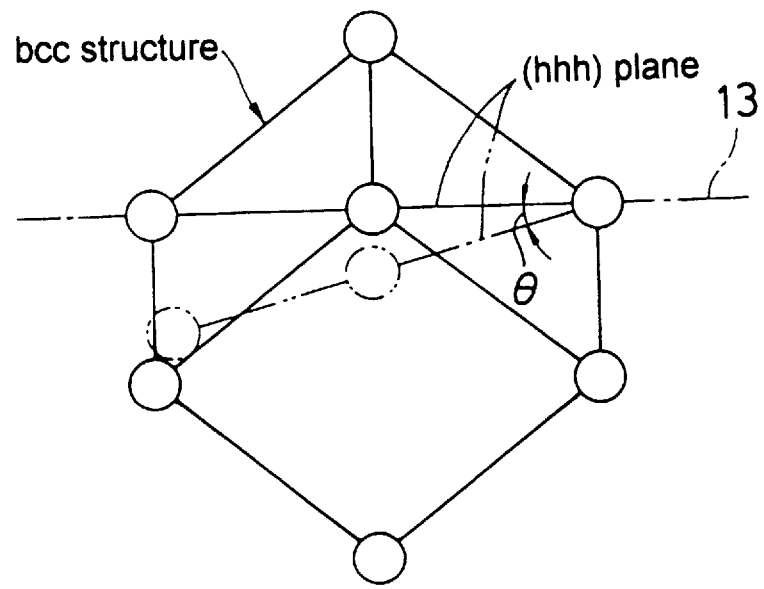
FIG. 8 is a diagrammatic illustration for explaining the inclination of an (hhh) plane in the body-centered cubic structure.

As shown in FIG. 8, the inclination of the (hhh) plane with respect to a phantom plane 13 along the slide surface 4a appears as an inclination of the hexagonal or trigonal pyramid-shaped metal crystal 6, 7 and hence, an influence is imparted to the oil retention and the wear resistance of the slide surface construction. The inclination angle θ formed by the (hhh) plane with respect to the phantom plane 13 is set in a range of $0° \leq \theta \leq 15°$. In this case, the direction of inclination of the (hhh) plane is not limited. If the inclination angle θ is larger than 15°, the slide surface construction 4 has a reduced oil retention and a reduced wear resistance. The inclination angle θ also applies to the (2hhh) plane.

Examples of the metal crystal having the bcc structure include simple crystals of Fe, Cr, Mo, W, Ta, Zr, Nb, V and the like and crystals of alloys of these elements.

In a plating process for forming the slide surface construction, the basic conditions for a plating bath in carrying out an electrolytic Fe-plating process are as given in Table 1.

TABLE 1

| Plating bath | | |
|---|---|---|
| Ferrous sulfate (g/liter) | pH | Temperature (°C.) |
| 100–400 | 5–7 | 10–60 |

Figure 9:
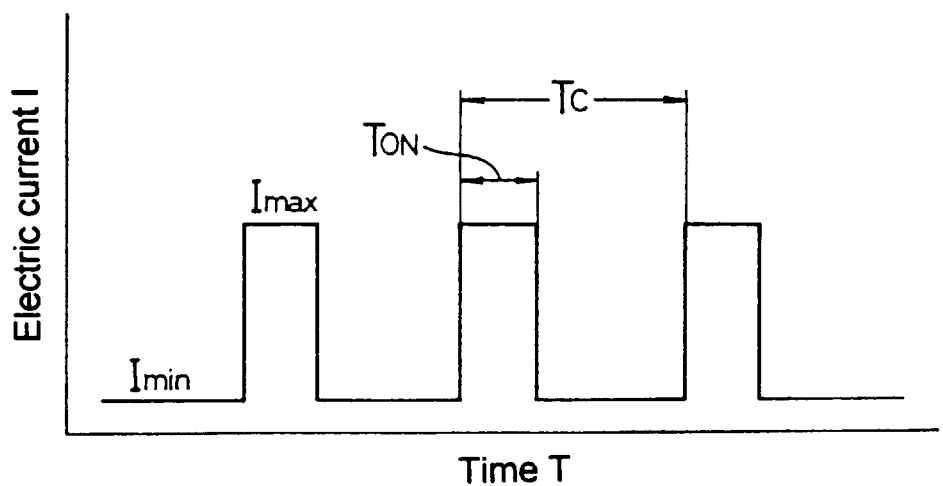
FIG. 9 is a waveform of an output from a power source for an electrolytic plating.

A pulse current process is mainly utilized as an energizing method. In the pulse current process, electric current I from a plating power source is controlled to describe a pulse waveform with the passage of time T, so that the current I is increased from a minimum current value Imin and reaches a maximum current value Imax, and is then dropped to the minimum current value Imin, as shown in FIG. 9.

If the energization time period from the start of the increasing of the electric current I to the start of the decreasing of the electric current I is represented by $T_{ON}$, and a cycle time period is represented by $T_C$, wherein one cycle is defined as being from the start of one current increasing to the start of the next current increasing, the ratio of the energization time period $T_{ON}$ to the cycle time period $T_C$, i.e., the time ratio $T_{ON}/T_C$ preferably is set in a range of $T_{ON}/T_C \geq 0.45$. The maximum cathode current density CDmax preferably is set in a range of $CDmax \geq 2$ A dm$^2$, and the average cathode current density CDm preferably is set in a range of $CDm \geq 1$ A dm$^2$.

If such a pulse current process is utilized, the ion concentration in the vicinity of a cathode is uniformized due to the fact that the maximum electric current alternately flows and does not flow in the plating bath. Thus, the composition of the slide surface construction 4 can be stabilized.

In the above-described electric Fe plating process, the precipitation and content (which indicates an amount present) of the (hhh) oriented Fe crystals or the (2hhh) oriented Fe crystals are controlled by changing the plating bath conditions and the energizing conditions. This control is easy under the utilization of the pulse current process and hence, the slide surface 4a is easily formed into an intended form.

The content of oxygen (O) in the slide surface construction is controlled mainly by the pH value and the temperature of the plating bath, but the maximum cathode current density CDmax, the average cathode density CDm and the like may be used as control factors. When phosphorus (P) is incorporated in the slide surface construction 4, a P-containing additive is added in an amount of 2 g/liter into the plating bath. The P-containing additives which may be used include substances which contain phosphorus and are soluble in water, such as sodium hypophosphite, potassium pyrophosphate, sodium dihydrogenphosphate and the like. The H content is controlled mainly by the temperature of the plating bath. When carbon (C) is incorporated in the slide surface construction 4, a C-containing additive is added in an amount of 2 g/liter into the plating bath. The C-containing additives which may be used include substances which contain carbon (C) and are soluble in water, such as saccharin, gelatin, ascorbic acid and the like. When boron (B) is incorporated in the slide surface construction 4, a B-containing additive is added in an amount of 30 g/liter into the plating bath. The B-containing additives which may be used include substances which contain boron (B) and which are soluble in water, such as boric acid, ammonium borate and the like.

The content of O, P, H, C and B contained in the slide surface construction 4 are extremely small. Therefore, in order to control each of these contents and to uniformly disperse these elements, a liquid replenisher adjusted to the same composition and the same temperature as those of the plating bath is supplied in a predetermined amount between the anode and the cathode during plating. If such supplying is not carried out, the pH value and temperature of the plating bath with regard to oxygen (O), the temperature of the plating bath with regard to hydrogen (H), and the concentration of each of the P-, C- and B-containing additives with regard to phosphorus (P), carbon (C) and boron (B), would be varied and for this reason, it would be difficult to control the content of O, P, H, C and B in the slide surface construction 4.

In addition to the electrolytic plating, examples of other plating processes are a PVD process, a CVD process, a sputtering process, an ion plating and the like, which are gas-phase plating processes. Conditions for carrying out the plating of tungsten (W) and molybdenum (Mo) by the sputtering process are as follows: for example, an AR gas pressure is in a range of 0.2 to 1 Pa; an average Ar gas accelerating electric power is in range of D.C. 1 to 1.5 kW; and a substrate temperature is in a range of 150° to 300° C. In this case, each of oxygen (O), phosphorus (P), carbon (C) and boron (B) can be incorporated in the slide surface construction 4 by a procedure which will be described below. With regard to oxygen (O), nitrous oxide ($N_2O$) is sprayed onto a surface of a substrate at 0.1 to 5 SCCM (cc/min). With regard to phosphorus (P), hydrogen gas containing 5% of phosphine ($PH_3$) is sprayed onto a surface of a substrate at 0.1 to 5 SCCM (cc/min). With regard to carbon (C), ethylene gas is sprayed onto a surface of a substrate at 0.1 to 5 SCCM (cc/min). With regard to boron (B), hydrogen gas containing 5% of diborane ($B_2H_6$) is sprayed onto a surface of a substrate at 0.1 to 5 SCCM (cc/min).

Conditions for carrying out the W-plating, by the CVD process are as follows: for example, a starting material is $WF_6$; a gas flow rate is in a range of 2 to 15 cc/min; a pressure within a chamber is in a range of 50 to 300 Pa; a substrate temperature is in a range of 400° to 600° C.; and an average output of ArF excimer laser is in a range of 5 to 40 W. In this case, each of oxygen (O), carbon (C) and boron (B) can be incorporated in the slide surface construction 4 by a procedure which will be described below. With regard to oxygen (O), nitrous oxide ($N_2O$) is supplied to flow at 1 to 10 SCCM (cc/min) within a chamber. With regard to phosphorus (P), hydrogen gas containing 5% of phosphine ($PH_3$) is supplied to flow at 1 to 10 SCCM (cc/min) within a chamber. With regard to carbon (C), methane gas is supplied to flow at 1 to 10 SCCM (cc/min) within a chamber. With regard to boron (B), hydrogen gas containing 5% of diborane is supplied to flow at 1 to 10 SCCM (cc/min) within a chamber. When hydrogen (H) is incorporated in the slide surface construction 4, hydrogen is supplied to flow within a chamber during a gas-phase plating process.

First Embodiment

The first embodiment will be described as for a slide surface construction, which is formed of an aggregate of Fe crystals. In this slide surface construction, a large number of trigonal pyramid-shaped Fe crystals and/or a large number of hexagonal pyramid-shaped Fe crystals exist in a slide surface, and the aggregate contains at least one of oxygen (O) and phosphorus (P).

(Ia) Slide surface construction containing oxygen (O)

A plurality of piston pins 1 for an internal combustion engine were produced by subjecting an outer peripheral surface 3 of the pipe-like substrate 2 made of a steel (JIS SCM420) to an electrolytic Fe-plating process to form a slide surface construction 4 formed of an aggregate of Fe crystals and having a thickness of 15 μm.

Tables 2, 3, 4 and 5 show conditions for the electrolytic Fe-plating process for examples of the slide surface constructions; with Table 2 corresponding to the examples 1 to 5; with Table 3 corresponding to the examples 6 to 10; with Table 4 corresponding to the examples 11 to 15; and with Table 5 corresponding to the examples 16 to 20. The plating time was varied within a range of 5 to 60 minutes in order to set the thickness of the examples 1 to 20 at 15 μm, as described above. The amount of liquid replenisher supplied was set at 0.5 liters/min.

TABLE 2

| Slide surface construction | Plating bath | | | Pulse current process | | | |
|---|---|---|---|---|---|---|---|
| | Ferrous sulfate (g/liter) | pH | Temperature (°C.) | CDmax (A/dm$^2$) | CDm (A/dm$^2$) | $T_{ON}T_C$ | $T_{ON}$ (msec) |
| Example 1 | 400 | 6 | 50 | 20 | 4 | 0.2 | 2 |
| Example 2 | 400 | 6.3 | 50 | 20 | 4 | 0.2 | 2 |
| Example 3 | 400 | 6 | 45 | 20 | 4 | 0.2 | 2 |
| Example 4 | 400 | 6.3 | 43 | 20 | 4 | 0.2 | 2 |
| Example 5 | 400 | 6.3 | 40 | 20 | 4 | 0.2 | 2 |

TABLE 3

| Slide surface construction | Plating bath | | | Pulse current process | | | |
|---|---|---|---|---|---|---|---|
| | Ferrous sulfate (g/liter) | pH | Temperature (°C.) | CDmax (A/dm$^2$) | CDm (A/dm$^2$) | $T_{ON}T_C$ | $T_{ON}$ (msec) |
| Example 6 | 300 | 6 | 50 | 20 | 4 | 0.2 | 2 |
| Example 7 | 300 | 6 | 50 | 25 | 5 | 0.2 | 2 |
| Example 8 | 300 | 6.3 | 45 | 20 | 4 | 0.2 | 2 |
| Example 9 | 300 | 6.3 | 45 | 25 | 5 | 0.2 | 2 |
| Example 10 | 300 | 6.3 | 45 | 30 | 6 | 0.2 | 2 |

TABLE 4

| Slide surface construction | Plating bath | | | Pulse current process | | | |
|---|---|---|---|---|---|---|---|
| | Ferrous sulfate (g/liter) | pH | Temperature (°C.) | CDmax (A/dm$^2$) | CDm (A/dm$^2$) | $T_{ON}T_C$ | $T_{ON}$ (msec) |
| Example 11 | 200 | 6 | 50 | 15 | 3 | 0.2 | 2 |
| Example 12 | 200 | 6 | 50 | 25 | 5 | 0.2 | 2 |
| Example 13 | 200 | 6.2 | 45 | 15 | 3 | 0.2 | 2 |
| Example 14 | 200 | 6.3 | 45 | 15 | 3 | 0.2 | 2 |
| Example 15 | 200 | 6.3 | 45 | 35 | 7 | 0.2 | 2 |

TABLE 5

| Slide surface construction | Plating bath | | | Pulse current process | | | |
|---|---|---|---|---|---|---|---|
| | Ferrous sulfate (g/liter) | pH | Temperature (°C.) | CDmax (A/dm$^2$) | CDm (A/dm$^2$) | $T_{ON}T_C$ | $T_{ON}$ (msec) |
| Example 16 | 100 | 6 | 50 | 15 | 3 | 0.2 | 2 |
| Example 17 | 100 | 6 | 50 | 25 | 5 | 0.2 | 2 |
| Example 18 | 100 | 6 | 45 | 25 | 5 | 0.2 | 2 |
| Example 19 | 100 | 6.3 | 45 | 25 | 5 | 0.2 | 2 |
| Example 20 | 100 | 6.5 | 45 | 8 | 1.6 | 0.2 | 2 |

Tables 6, 7, 8 and 9 show the crystal form of the slide surface, the area rate A and grain size of the trigonal and/or hexagonal pyramid-shaped Fe crystals in the slide surface, the content (amount present) S of the oriented Fe crystals, the O content and the hardness of the section of the slide surface construction for the examples 1 to 20 of the slide surface constructions, with Table 6 corresponding to the examples 1 to 5; with Table 7 corresponding to the examples 6 to 10; with Table 8 corresponding to the examples 11 to 15; and with Table 9 corresponding to the examples 16 to 20.

TABLE 6

| Slide surface construction | Crystal form of slide surface | Hexagonal pyramid-shaped Fe crystals | | Content S (%) of oriented Fe crystals | | | | | O content (% by weight) | Hardness HmV |
|---|---|---|---|---|---|---|---|---|---|---|
| | | Area rate A (%) | Grain size (μm) | {110} | {200} | {211} | {310} | {222} | | |
| Example 1 | Hexagonal pyramid-shaped | 90 | 2–3 | 0.7 | 0.3 | 3.1 | 1.8 | 94.1 | 0.02 | 210 |
| Example 2 | Hexagonal pyramid-shaped | 90 | 1–3 | 0.3 | 0.8 | 4.5 | 2 | 92.4 | 0.18 | 240 |
| Example 3 | Hexagonal pyramid-shaped | 90 | 1–2 | 0.5 | 1.3 | 4.7 | 2.2 | 91.3 | 0.2 | 400 |
| Example 4 | Hexagonal pyramid-shaped | 90 | 0.5–2 | 0.6 | 1 | 4.9 | 2.6 | 90.9 | 0.4 | 470 |
| Example 5 | Hexagonal pyramid-shaped | 90 | 0.5–1 | 0.6 | 1.4 | 5.3 | 2 | 90.7 | 0.6 | 550 |

TABLE 7

| Slide surface construction | Crystal form of slide surface | Trigonal, Hexagonal pyramid-shaped Fe crystals | | Content S (%) of oriented Fe crystals | | | | | O content (% by weight) | Hardness HmV |
|---|---|---|---|---|---|---|---|---|---|---|
| | | Area rate A (%) | Grain size (μm) | {110} | {200} | {211} | {310} | {222} | | |
| Example 6 | Hexagonal and trigonal pyramid-shaped | 60 | 1–5 | 10.4 | 8.2 | 12.5 | 8.2 | 60.7 | 0.02 | 190 |
| Example 7 | Hexagonal and trigonal pyramid-shaped | 60 | 1–5 | 11.2 | 7.9 | 11.8 | 8.8 | 60.3 | 0.18 | 230 |
| Example 8 | Hexagonal and trigonal pyramid-shaped | 60 | 0.5–4 | 9.9 | 7.3 | 11.7 | 8.8 | 62.3 | 0.2 | 380 |
| Example 9 | Hexagonal and trigonal pyramid-shaped | 60 | 0.5–3 | 10.7 | 6 | 13.1 | 8.4 | 61.8 | 0.4 | 400 |
| Example 10 | Hexagonal and trigonal pyramid-shaped | 60 | 0.5–2 | 11.5 | 8.4 | 12.4 | 6.5 | 61.2 | 0.6 | 450 |

TABLE 8

| Slide surface construction | Crystal form of slide surface | Trigonal pyramid-shaped Fe crystals | | Content S (%) of oriented Fe crystals | | | | | O content (% by weight) | Hardness HmV |
|---|---|---|---|---|---|---|---|---|---|---|
| | | Area rate A (%) | Grain size (μm) | {110} | {200} | {211} | {310} | {222} | | |
| Example 11 | Trigonal | 40 | 0.5–6 | 16.8 | 14.4 | 16.3 | 10.5 | 42 | 0.02 | 200 |

TABLE 8-continued

| Slide surface construction | Crystal form of slide surface | Trigonal pyramid-shaped Fe crystals | | Content S (%) of oriented Fe crystals | | | | | O content (% by weight) | Hardness HmV |
| | | Area rate A (%) | Grain size (μm) | {110} | {200} | {211} | {310} | {222} | | |
|---|---|---|---|---|---|---|---|---|---|---|
| Example 12 | Trigonal pyramid-shaped | 40 | 0.5–6 | 17.5 | 13.9 | 16 | 10.9 | 41.7 | 0.18 | 240 |
| Example 13 | Trigonal pyramid-shaped | 40 | 0.5–4 | 20.2 | 12.5 | 16.7 | 9.7 | 40.9 | 0.2 | 360 |
| Example 14 | Trigonal pyramid-shaped | 40 | 0.5–2 | 20.6 | 12 | 16.8 | 9.4 | 41.2 | 0.4 | 390 |
| Example 15 | Trigonal pyramid-shaped | 40 | 0.5–2 | 21.3 | 11.1 | 17.6 | 9 | 41 | 0.6 | 410 |

TABLE 9

| Slide surface construction | Crystal form of slide surface | Trigonal pyramid-shaped Fe crystals | | Content S (%) of oriented Fe crystals | | | | | O content (% by weight) | Hardness HmV |
| | | Area rate A (%) | Grain size (μm) | {110} | {200} | {211} | {310} | {222} | | |
|---|---|---|---|---|---|---|---|---|---|---|
| Example 16 | Trigonal pyramid-shaped | 35 | 0.5–5 | 19.6 | 9.2 | 22.5 | 13.8 | 34.9 | 0.02 | 180 |
| Example 17 | Trigonal pyramid-shaped | 35 | 0.5–5 | 19.9 | 11.4 | 20.8 | 13.3 | 34.6 | 0.18 | 220 |
| Example 18 | Trigonal pyramid-shaped | 35 | 0.5–5 | 19.5 | 12.1 | 21.7 | 12.4 | 34.3 | 0.2 | 370 |
| Example 19 | Trigonal pyramid-shaped | 35 | 0.5–5 | 19.4 | 11.2 | 21.3 | 12.9 | 35.2 | 0.4 | 390 |
| Example 20 | Trigonal pyramid-shaped | 35 | 0.5 | 20.1 | 13 | 19.6 | 13.6 | 33.7 | 0.6 | 400 |

The area rate A of trigonal and/or hexagonal pyramid-shaped Fe crystals was determined according to an equation, $A=(c/b)\times 100(\%)$, wherein b represents the area of the slide surface, and c represents an area occupied in the slide surface by all of the trigonal and/or hexagonal pyramid-shaped Fe crystals. The grain size of the hexagonal pyramid-shaped Fe crystals is an average value of distances between opposed corners on opposite sides of an apex, i.e., of lengths of three diagonal lines. The grain size of the trigonal pyramid-shaped Fe crystals is an average value of distances from each corner via an apex to each opposed side, i.e., three distances.

The content S was determined by the following method based on X-ray diffraction patterns (wherein X-ray was applied in a direction perpendicular to the slide surface) for the examples 1 to 20. FIG. 10 is an X-ray diffraction pattern for the example 4. For example, the {110} oriented Fe crystal means an oriented Fe crystal with its {110} plane oriented toward the slide surface 4a.

{110} Oriented Fe crystals: $S_{110}=\{(I_{110}/IA_{110})/T\}\times 100$
{200} Oriented Fe crystals: $S_{200}=\{(I_{200}/IA_{200})/T\}\times 100$
{211} Oriented Fe crystals: $S_{211}=\{(I_{211}/IA_{211})/T\}\times 100$
{310} Oriented Fe crystals: $S_{310}=\{(I_{310}/IA_{310})/T\}\times 100$
{222} Oriented Fe crystals: $S_{222}=\{(I_{222}/IA_{222})/T\}\times 100$
wherein each of $I_{110}$, $I_{200}$, $I_{211}$, $I_{310}$ and $I_{222}$ is a measurement (cps) of an intensity of X-ray reflected from each crystal plane; each of $IA_{110}$, $IA_{200}$, $IA_{211}$, $IA_{310}$ and $IA_{222}$ is an intensity ratio of X-rays reflected from crystal planes in an ASTM card, $IA_{110}=100$; $IA_{200}=20$; $IA_{211}=30$; $IA_{310}=12$; and $IA_{222}=6$. Further, $T=(I_{110}/IA_{110})+(1_{200}/IA_{200})+(I_{211}/IA_{211})+(I_{310}/IA_{310})+(I_{222}/IA_{222})$.

Figure 11A:
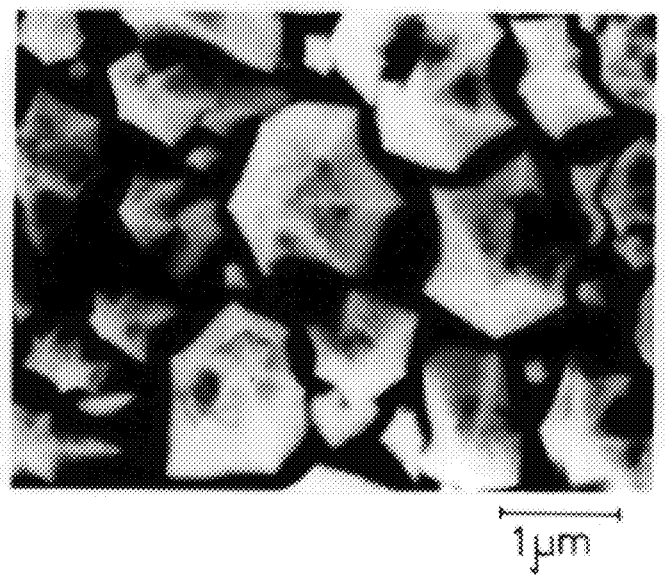
FIG. 11A is a photomicrograph showing the crystal structure of a slide surface of the example 4.
Figure 11B:
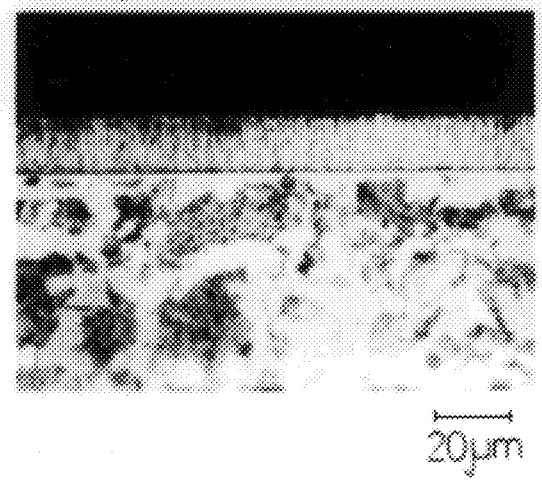
FIG. 11B is a photomicrograph showing the crystal structure of a vertical section of the example 4.

FIGS. 11A and 11B are photomicrographs showing the crystal structure of the example 4. As shown in FIG. 11A, a large number of hexagonal pyramid-shaped Fe crystals are observed in the slide surface, and as shown in FIG. 11B, a large number of columnar Fe crystals are observed in the vertical section of the slide surface construction. In this case, the area rate A of the hexagonal pyramid-shaped Fe crystals is equal to 90%, as given in Table 6. The columnar Fe crystals and thus the hexagonal pyramid-shaped Fe crystals are {222} oriented Fe crystals with their (hhh) plane, i.e., {222} plane oriented toward the slide surface. The content S of the {222} oriented Fe crystals is equal to 90.9%, as shown in Table 6 and FIG. 10.

The measurement of the O content was carried out by a procedure which comprises peeling-off each of the examples 1 to 20 from the substrate 2 and then subjecting each example to an analysis according to an inert gas melting/thermal conductimetry (JIS Z2613).

Figure 12:
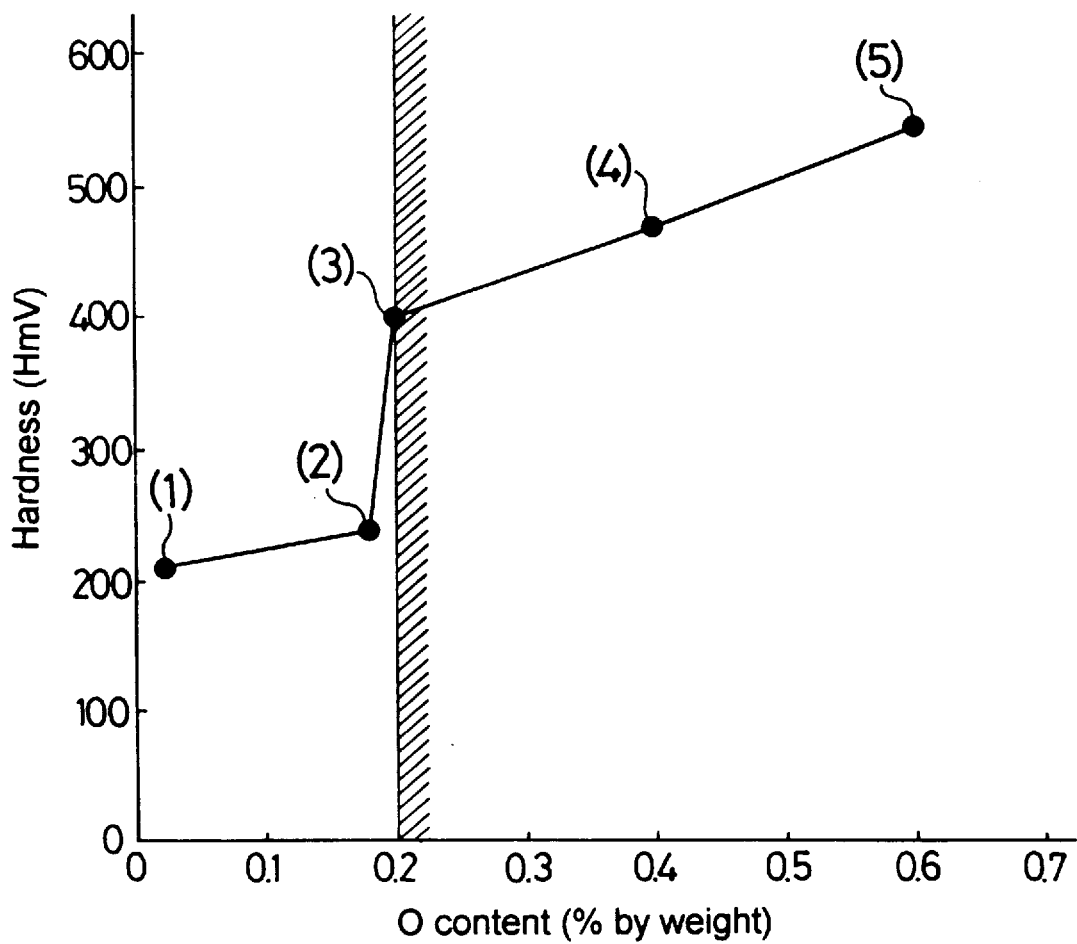
FIG. 12 is a graph illustrating the relationship between the oxygen O content and the hardness.

FIG. 12 is a graph illustrating the relationship between the O content and the hardness for the examples 1 to 5. In FIG. 12, points (1) to (5) correspond to the examples 1 to 5, respectively. The relation between the point and the example applies to the Figures which will be described hereinafter. It can be seen from FIG. 12 that if the O content is set in a range of O≧0.2% by weight, the hardness is suddenly increased. The same is true of the examples 6 to 20, as set forth in Tables 7, 8 and 9.

Then, chips of the examples 1 to 20 were fabricated and subjected to a seizure test in a chip-on-disk manner under lubrication to measure the seizure generating load, thereby providing the results given in Table 10. Conditions for the seizure test are as follows: The material for a disk is an Al—Si (10% by weight) alloy; the peripheral speed of the disk is 15 m/sec; the amount of oil supplied is 0.3 ml/min; and the area of the slide surface of the chip is 1 cm².

TABLE 10

| Slide surface construction | Seizure generating load (N) | Slide surface construction | Seizure generating load (N) |
| --- | --- | --- | --- |
| Example 1 | 1200 | Example 11 | 800 |
| Example 2 | 1300 | Example 12 | 850 |
| Example 3 | 2050 | Example 13 | 1600 |
| Example 4 | 2150 | Example 14 | 1750 |
| Example 5 | 2300 | Example 15 | 1850 |
| Example 6 | 1010 | Example 16 | 250 |
| Example 7 | 1100 | Example 17 | 300 |
| Example 8 | 1800 | Example 18 | 600 |
| Example 9 | 1950 | Example 19 | 650 |
| Example 10 | 2100 | Example 20 | 700 |

Figure 13:
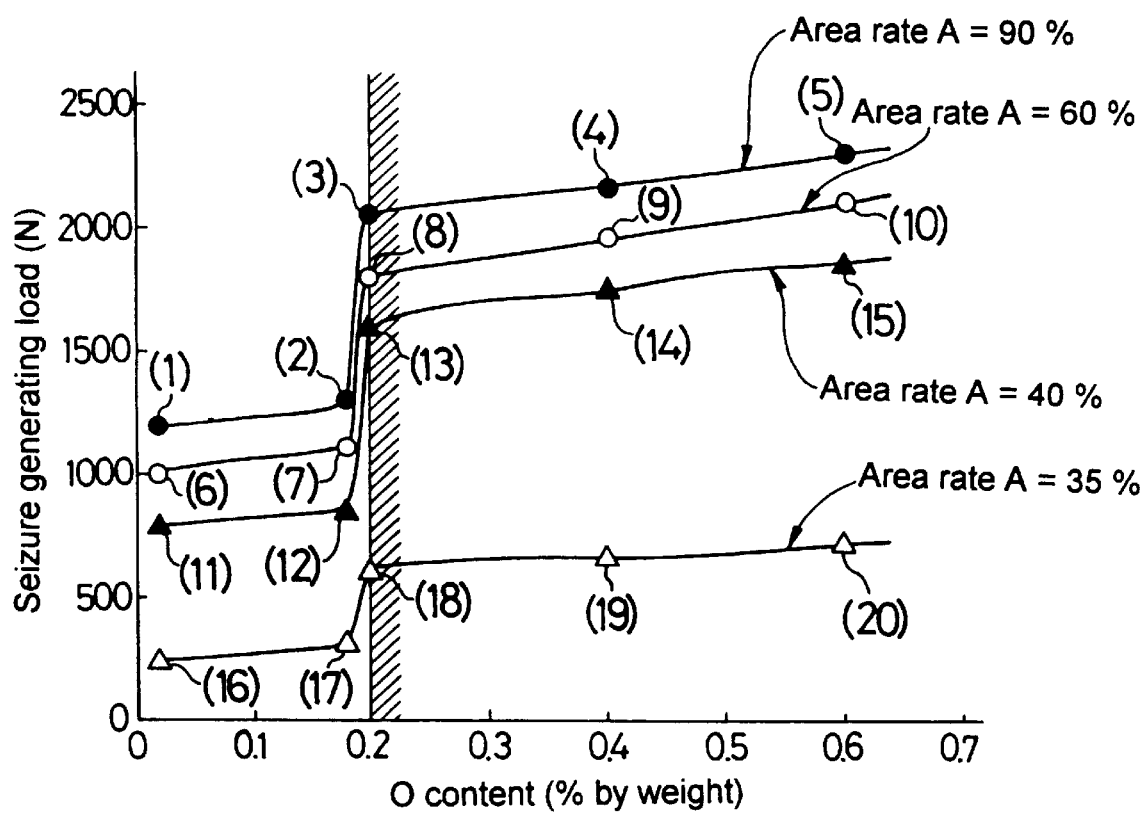
FIG. 13 is a graph illustrating the relationship between the oxygen O content and the seizure generating load.
Figure 14:
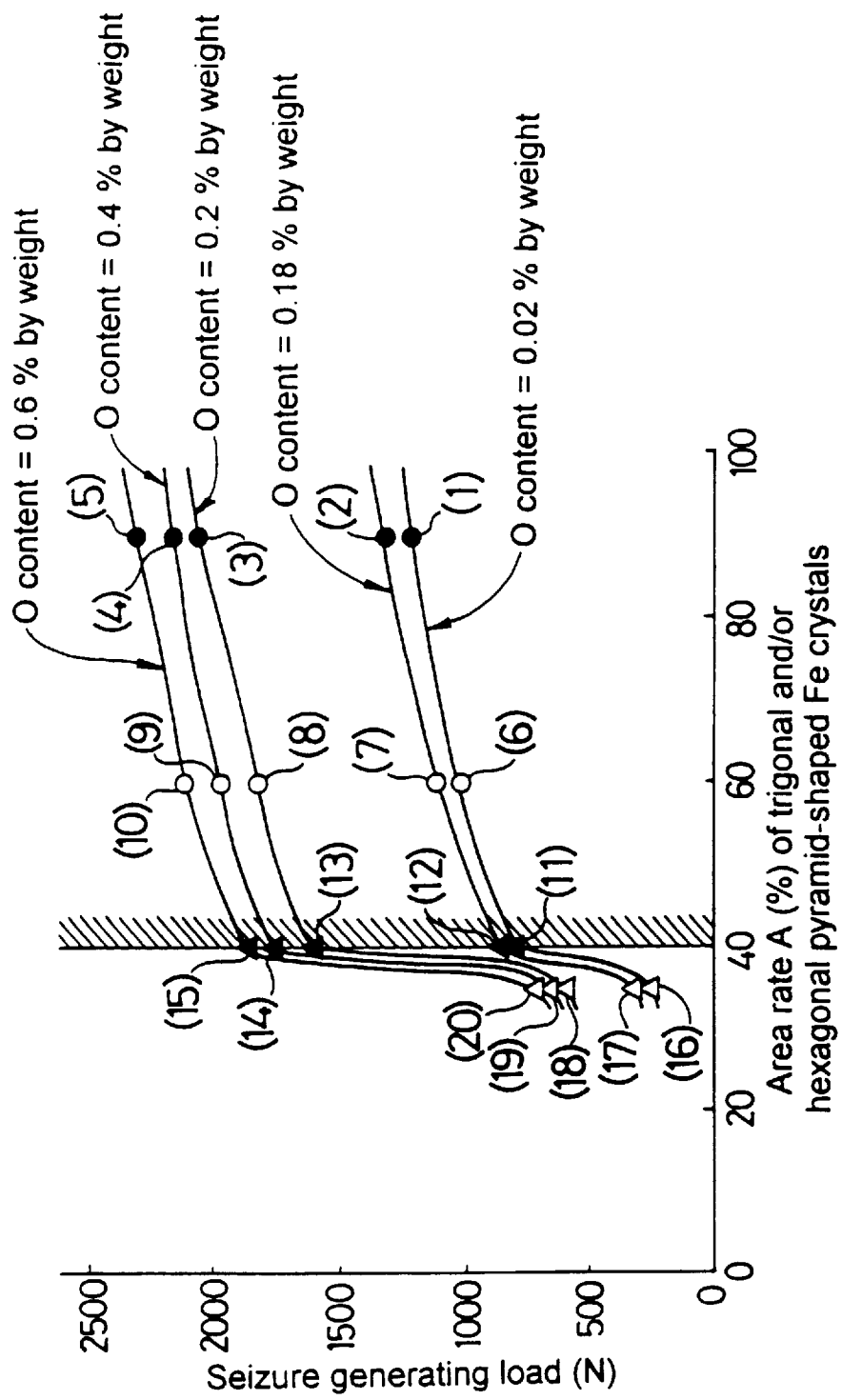
FIG. 14 is a graph illustrating the relationship between the area rate A of trigonal and hexagonal pyramid-shaped Fe crystals and the seizure generating load.

FIG. 13 illustrates the relationship between the O content and the seizure generating load for the examples 1 to 20, and FIG. 14 illustrates the relationship between the area rate A of the trigonal and/or hexagonal pyramid-shaped Fe crystals and the seizure generating load for the examples 1 to 20.

If the examples 1 to 5 are compared with one another in FIG. 13, they have the same area rate A of the hexagonal pyramid-shaped Fe crystals and the initially equivalent oil retention, but the examples 3 to 5 have the O content equal to or higher than 0.2% by weight and the hardness higher than those of the examples 1 and 2. Therefore, the examples 3 to 5 exhibit an excellent wear resistance and hence, the oil retention thereof is maintained. Consequently, the examples 3 to 5 have a seizure resistance superior to the examples 1 and 2. The same is true of a comparison between the examples 8 to 10 and the examples 6 and 7; between the examples 13 to 15 and the examples 11 and 12; and between the examples 18 to 20 and the examples 16 and 17. From this, it can be seen that in order to enhance the seizure resistance, the O content may be set in a range of O≧0.2% by weight, if the area rate A is constant.

If the examples 5, 10, 15 and 20 are compared with one another in FIG. 14, they have the same O content, but the examples 5, 10 and 15 have a better oil retention than that of the example 20, because the area rate A is equal to or higher than 40%. Consequently, the examples 5, 10 and 15 have a seizure resistance superior to the example 20. The same is true of a comparison between the examples 4, 9 and 14 and the example 19; between the examples 3, 8 and 13 and the example 18; between the examples 2, 7 and 12 and the example 17; and between the examples 1, 6 and 11 and the example 16. From this, it can be seen that in order to enhance the seizure resistance, the area rate A may be set in a range of A≧40%, if the O content is constant.

Therefore, it can be concluded that it is required for the slide surface construction 4 capable of withstanding a severe sliding environment to have requirements of an area rate A≧40% and an O content≧0.2% by weight. These requirements are satisfied by the examples 3 to 5, 8 to 10, and 13 to 15. Consequently, the seizure generating surface pressure for these examples is equal to or larger than 1600N and remarkably high, as compared with those of the other examples.

(Ib) Slide surface construction containing phosphorus (P)

A plurality of piston pins 1 for an internal combustion engine were produced by subjecting an outer peripheral surface 3 of a pipe-like substrate 2 made of a steel (JIS SCM420) to an electrolytic Fe-plating process to form a slide surface construction 4 formed of an aggregate of Fe crystals and having a thickness of 15 μm.

Tables 11, 12, 13 and 14 show conditions for the electrolytic Fe-plating process for examples of the slide surface constructions; with Table 11 corresponding to the examples 1 to 4; with Table 12 corresponding to the examples 5 to 8; with Table 13 corresponding to the examples 9 to 12; and with Table 14 corresponding to the examples 13 to 16. The plating time was varied within a range of 5 to 60 minutes in order to set the thickness of the examples 1 to 16 at 15 μm, as described above. The amount of liquid replenisher supplied was set at 0.5 liters/min.

TABLE 11

| Slide surface construction | Plating bath | | | | Pulse current process | | | |
| --- | --- | --- | --- | --- | --- | --- | --- | --- |
| | Composition (g/liter) | | | | | | | |
| | Ferrous sulfate | Sodium hypophosphite | pH | Temperature (°C.) | CDmax (A/dm²) | CDm (A/dm²) | $T_{ON}/T_C$ | $T_{ON}$ (msec) |
| Example 1 | 400 | 1 | 6 | 50 | 10 | 2 | 0.2 | 2 |
| Example 2 | 400 | 1 | 6 | 50 | 12.5 | 2.5 | 0.2 | 2 |
| Example 3 | 400 | 2 | 6 | 50 | 15 | 3 | 0.2 | 2 |
| Example 4 | 400 | 2 | 6 | 50 | 20 | 4 | 0.2 | 2 |

TABLE 12

| Slide surface construction | Plating bath Composition (g/liter) | | | Temperature (°C.) | Pulse current process | | | |
|---|---|---|---|---|---|---|---|---|
| | Ferrous sulfate | Sodium hypophosphite | pH | | CDmax (A/dm$^2$) | CDm (A/dm$^2$) | $T_{ON}/T_C$ | $T_{ON}$ (msec) |
| Example 5 | 300 | 1 | 6 | 50 | 10 | 2 | 0.2 | 2 |
| Example 6 | 300 | 1 | 6 | 50 | 12.5 | 2.5 | 0.2 | 2 |
| Example 7 | 300 | 2 | 6 | 50 | 15 | 3 | 0.2 | 2 |
| Example 8 | 300 | 2 | 6 | 50 | 20 | 4 | 0.2 | 2 |

TABLE 13

| Slide surface construction | Plating bath Composition (g/liter) | | | Temperature (°C.) | Pulse current process | | | |
|---|---|---|---|---|---|---|---|---|
| | Ferrous sulfate | Sodium hypophosphite | pH | | CDmax (A/dm$^2$) | CDm (A/dm$^2$) | $T_{ON}/T_C$ | $T_{ON}$ (msec) |
| Example 9 | 200 | 1 | 6 | 50 | 10 | 2 | 0.2 | 2 |
| Example 10 | 200 | 1 | 6 | 50 | 12.5 | 2.5 | 0.2 | 2 |
| Example 11 | 200 | 2 | 6 | 50 | 15 | 3 | 0.2 | 2 |
| Example 12 | 200 | 2 | 6 | 50 | 17.5 | 3.5 | 0.2 | 2 |

TABLE 14

| Slide surface construction | Plating bath Composition (g/liter) | | | Temperature (°C.) | Pulse current process | | | |
|---|---|---|---|---|---|---|---|---|
| | Ferrous sulfate | Sodium hypophosphite | pH | | CDmax (A/dm$^2$) | CDm (A/dm$^2$) | $T_{ON}/T_C$ | $T_{ON}$ (msec) |
| Example 13 | 100 | 1 | 6 | 50 | 10 | 2 | 0.2 | 2 |
| Example 14 | 100 | 1 | 6 | 50 | 12.5 | 2.5 | 0.2 | 2 |
| Example 15 | 100 | 2 | 6 | 50 | 17.5 | 3.5 | 0.2 | 2 |
| Example 16 | 100 | 2 | 6 | 50 | 20 | 4 | 0.2 | 2 |

Tables 15, 16, 17 and 18 show the crystal form of the slide surface, the area rate A and grain size of the trigonal and/or hexagonal pyramid-shaped Fe crystals in the slide surface, the content S (which indicates the amount present) of oriented Fe crystals, the P content and the hardness of a section of the slide surface construction for the examples 1 to 16. Table 15 corresponds to the examples 1 to 4; Table 16 corresponds to the examples 5 to 8; Table 17 corresponds to the examples 9 to 12; and Table 18 corresponds to the examples 13 to 16.

TABLE 15

| Slide surface construction | Crystal form of slide surface | Hexagonal pyramid-shaped Fe crystals | | Content S (%) of oriented Fe crystals | | | | | P content (% by weight) | Hardness HmV |
|---|---|---|---|---|---|---|---|---|---|---|
| | | Area rate A (%) | Grain size (μm) | {110} | {200} | {211} | {310} | {222} | | |
| Example 1 | Hexagonal pyramid-shaped | 90 | 0.5–6 | 0.7 | 0 | 5.3 | 0 | 94 | 0.01 | 240 |
| Example 2 | Hexagonal pyramid-shaped | 90 | 0.5–5 | 2.1 | 0 | 4.5 | 1.8 | 91.6 | 0.035 | 260 |
| Example 3 | Hexagonal pyramid-shaped | 90 | 0.5–4 | 1.2 | 0 | 7.2 | 0 | 91.6 | 0.04 | 440 |
| Example 4 | Hexagonal pyramid-shaped | 90 | 0.5–3 | 0 | 0 | 9.4 | 0 | 90.6 | 0.12 | 490 |

TABLE 16

| Slide surface construction | Crystal form of slide surface | Trigonal, Hexagonal pyramid-shaped Fe crystals Area rate A (%) | Grain size (μm) | Content S (%) of oriented Fe crystals {110} | {200} | {211} | {310} | {222} | P content (% by weight) | Hardness HmV |
|---|---|---|---|---|---|---|---|---|---|---|
| Example 5 | Hexagonal and trigonal pyramid-shaped | 60 | 0.5–5 | 16.2 | 0 | 18.5 | 2.5 | 62.8 | 0.01 | 220 |
| Example 6 | Hexagonal and trigonal pyramid-shaped | 60 | 0.5–5 | 15.7 | 0 | 20.7 | 3.1 | 60.5 | 0.035 | 250 |
| Example 7 | Hexagonal and trigonal pyramid-shaped | 60 | 0.5–4 | 16.1 | 0 | 19.7 | 2.8 | 61.4 | 0.04 | 450 |
| Example 8 | Hexagonal and trigonal pyramid-shaped | 60 | 0.5–4 | 19 | 0 | 17.9 | 3 | 60.1 | 0.12 | 500 |

TABLE 17

| Slide surface construction | Crystal form of slide surface | Trigonal pyramid-shaped Fe crystals Area rate A (%) | Grain size (μm) | Content S (%) of oriented Fe crystals {110} | {200} | {211} | {310} | {222} | P content (% by weight) | Hardness HmV |
|---|---|---|---|---|---|---|---|---|---|---|
| Example 9 | Trigonal pyramid-shaped | 40 | 0.5–6 | 25.3 | 0 | 30.6 | 3.6 | 40.5 | 0.01 | 210 |
| Example 10 | Trigonal pyramid-shaped | 40 | 0.5–6 | 22 | 0 | 33.7 | 3.9 | 40.4 | 0.035 | 240 |
| Example 11 | Trigonal pyramid-shaped | 40 | 0.5–6 | 19.7 | 0 | 35.2 | 4.4 | 40.7 | 0.04 | 450 |
| Example 12 | Trigonal pyramid-shaped | 40 | 0.5–5 | 17.7 | 0 | 36.7 | 4.8 | 40.8 | 0.12 | 510 |

TABLE 18

| Slide surface construction | Crystal form of slide surface | Trigonal pyramid-shaped Fe crystals Area rate A (%) | Grain size (μm) | Content S (%) of oriented Fe crystals {110} | {200} | {211} | {310} | {222} | P content (% by weight) | Hardness HmV |
|---|---|---|---|---|---|---|---|---|---|---|
| Example 13 | Trigonal pyramid-shaped | 35 | 0.5–5 | 20.4 | 9.4 | 23.4 | 12.2 | 34.6 | 0.01 | 280 |
| Example 14 | Trigonal pyramid-shaped | 35 | 0.5–5 | 18.9 | 10.5 | 26.3 | 10.1 | 34.2 | 0.035 | 310 |
| Example 15 | Trigonal pyramid- | 35 | 0.5–6 | 18.2 | 10.8 | 25.7 | 10.4 | 34.9 | 0.04 | 340 |

TABLE 18-continued

| Slide surface construction | Crystal form of slide surface | Trigonal pyramid-shaped Fe crystals | | Content S (%) of oriented Fe crystals | | | | | P content (% by weight) | Hardness HmV |
|---|---|---|---|---|---|---|---|---|---|---|
| | | Area rate A (%) | Grain size (μm) | {110} | {200} | {211} | {310} | {222} | | |
| Example 16 | shaped Trigonal pyramid-shaped | 35 | 0.5–6 | 19.1 | 11.2 | 25.6 | 9.8 | 34.3 | 0.12 | 360 |

Figure 15:
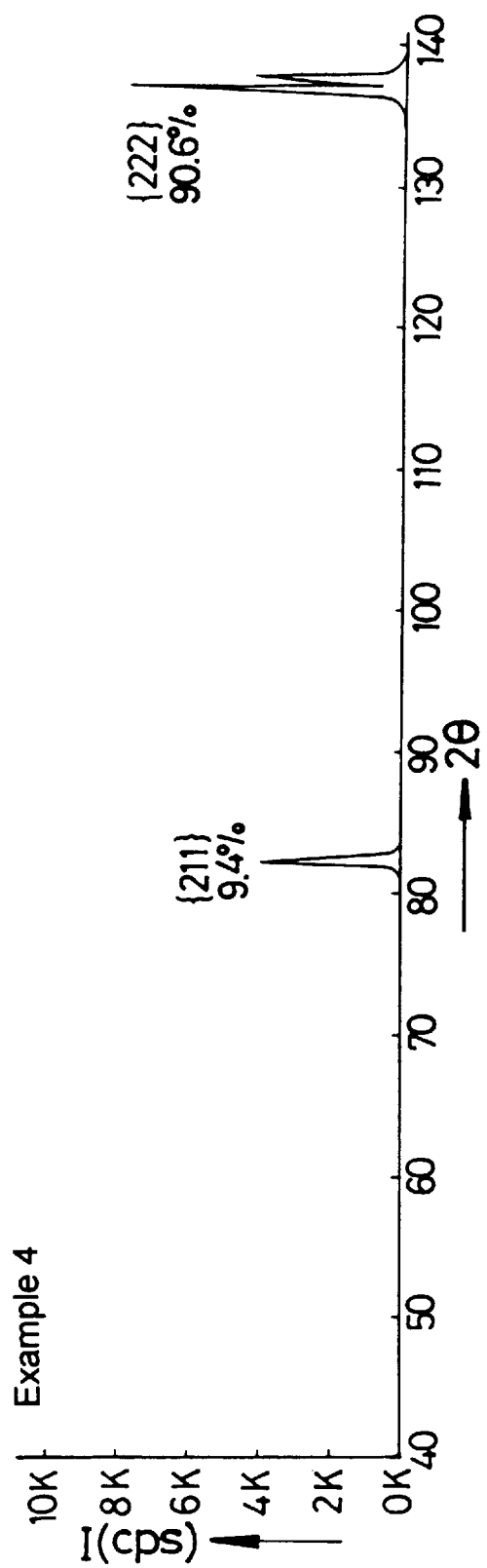
FIG. 15 is an X-ray diffraction pattern for another example 4.

The area rate A, the grain size and the content S were determined in a manner similar to that for the examples 1–20 section (Ia) above. FIG. 15 is an X-ray diffraction pattern for the example 4.

Figure 16:
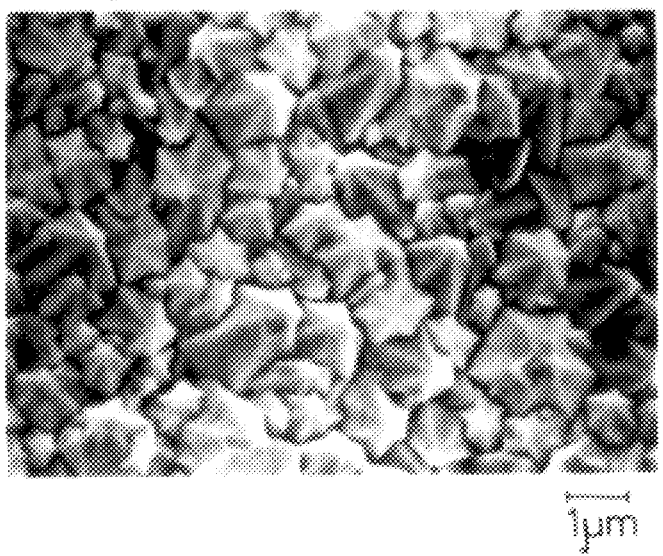
FIG. 16 is a photomicrograph showing the crystal structure of the slide surface of the example 4 of FIG. 15.

FIG. 16 is a photomicrograph showing the crystal structure of the slide surface of the example 4, wherein a large number of hexagonal pyramid-shaped Fe crystals are observed. In this case, as shown in Table 15, the area rate A of the hexagonal pyramid-shaped Fe crystals is equal to 90%. The hexagonal pyramid-shaped Fe crystals are {222} oriented Fe crystals, and the content S of the {222} oriented Fe crystals is equal to 90.6%, as shown in Table 15 and FIG. 15.

The measurement of the P content was carried out by a procedure which comprises peeling off each of the examples 1 to 16 from the substrate 2 and subjecting each example to a molybdic acid blue absorptiometric analysis (JIS G1214).

Figure 17:
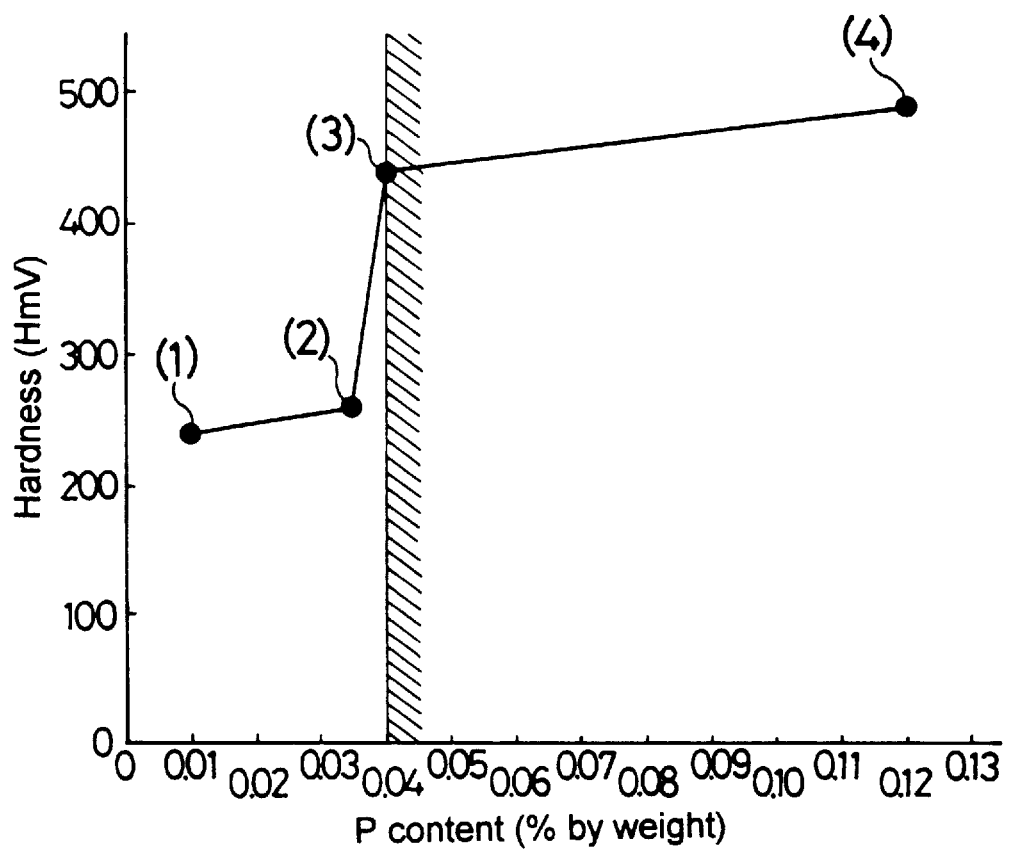
FIG. 17 is a graph illustrating the relationship between the P content and the hardness.

FIG. 17 is a graph illustrating the relationship between the P content and the hardness for the examples 1 to 4. It can be seen from FIG. 17 that if the P content is set in a range of P≧0.04% by weight, the hardness is suddenly increased. The same is true of the examples 5 to 16.

Then, chips of the examples 1 to 16 were fabricated and subjected to a seizure test in a chip-on-disk manner under lubrication to measure the seizure generating load, thereby providing the results given in Table 19. Conditions for the seizure test are identical to those described in section (Ia).

TABLE 19

| Slide surface construction | Seizure generating load (N) | Slide surface construction | Seizure generating load (N) |
|---|---|---|---|
| Example 1 | 1200 | Example 9 | 800 |
| Example 2 | 1300 | Example 10 | 880 |
| Example 3 | 2100 | Example 11 | 1500 |
| Example 4 | 2350 | Example 12 | 1650 |
| Example 5 | 1050 | Example 13 | 320 |
| Example 6 | 1120 | Example 14 | 400 |
| Example 7 | 1800 | Example 15 | 600 |
| Example 8 | 1980 | Example 16 | 680 |

Figure 18:
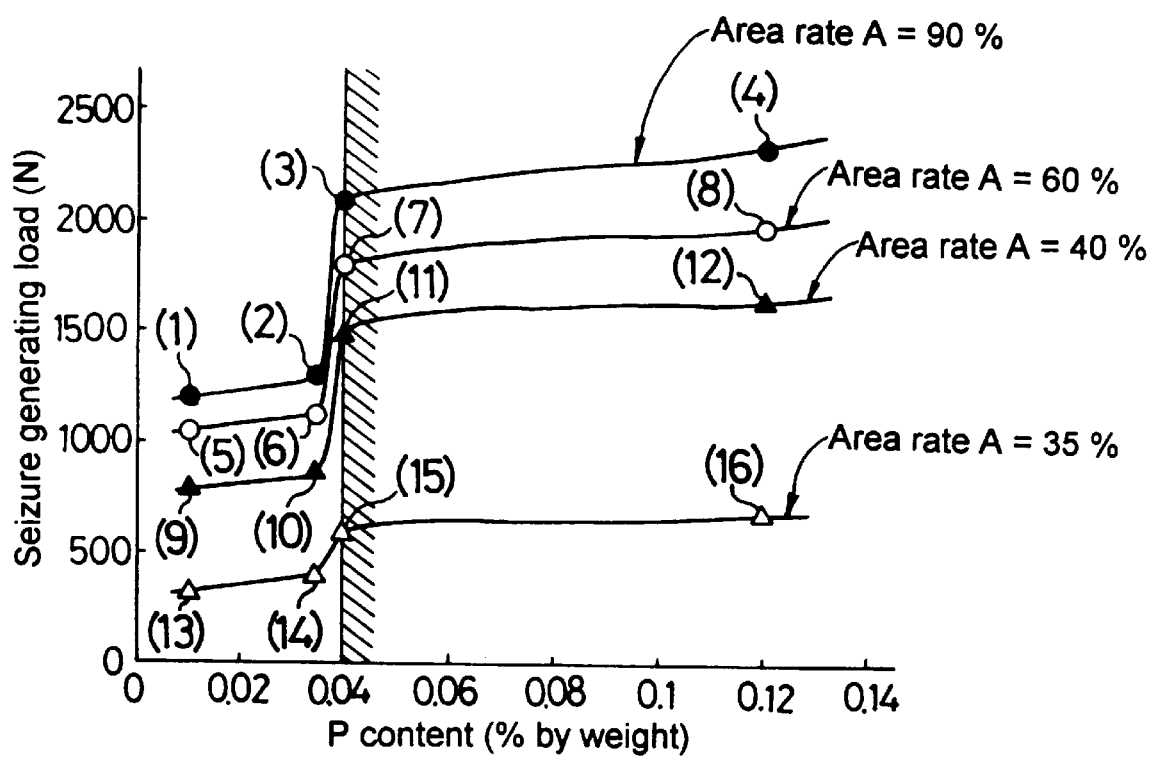
FIG. 18 is a graph illustrating the relationship between the P content and the seizure generating load.
Figure 19:
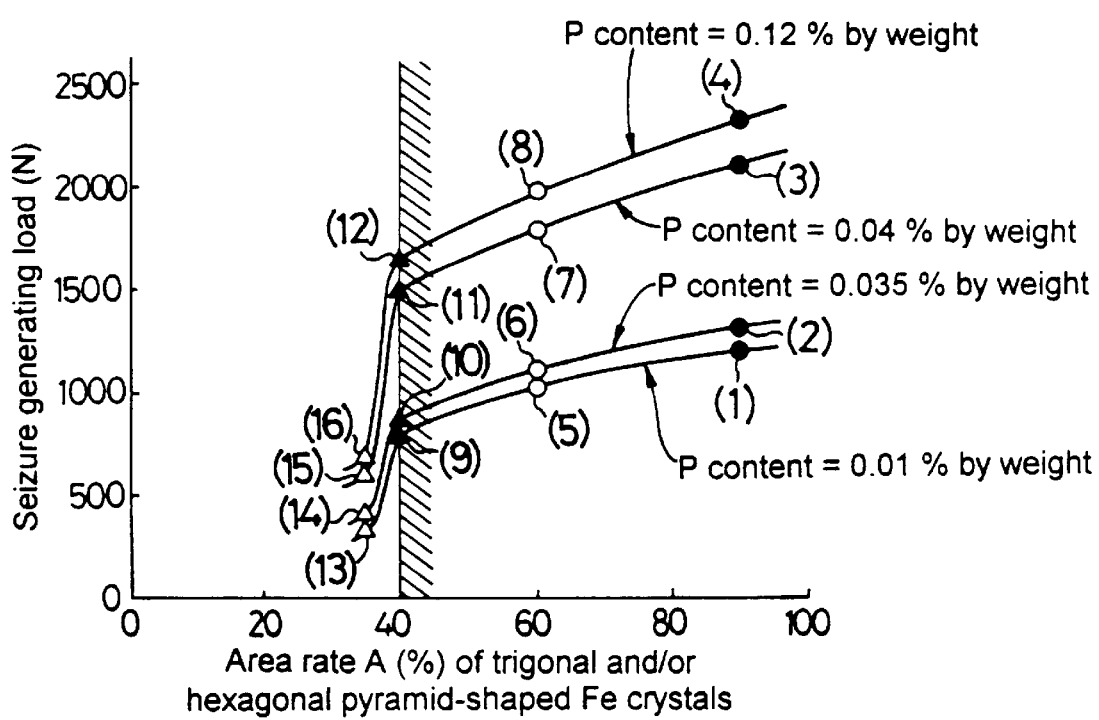
FIG. 19 is a graph illustrating the relationship between the area rate A of trigonal and hexagonal pyramid-shaped Fe crystals and the seizure generating load.

FIG. 18 illustrates the relationship between the P content and the seizure generating load for the examples 1 to 16, and FIG. 19 illustrates the relationship between the area rate A of the trigonal and/or hexagonal pyramid-shaped Fe crystals and the seizure generating load for the examples 1 to 16.

If the examples 1 to 4 are compared with one another in FIG. 18, they have the same area rate A of the hexagonal pyramid-shaped Fe crystals and the initially equivalent oil retention, but the examples 3 and 4 have the P content equal to or higher than 0.04% by weight, and the hardness higher than those of the examples 1 and 2. Therefore, the examples 3 and 4 exhibit an excellent wear resistance and hence, the oil retention thereof is maintained. Consequently, the examples 3 and 4 have a seizure resistance superior to the examples 1 and 2. The same is true of a comparison between the examples 7 and 8 and the examples 5 and 6; between the examples 11 and 12 and the examples 9 and 10; and between the examples 15 and 16 and the examples 13 and 14. From this, it can be seen that in order to enhance the seizure resistance, the P content may be set in a range of P≧0.04% by weight, if the area rate A is constant.

If the examples 4, 8, 12 and 16 are compared with one another in FIG. 19, they have the same P content, but examples 4, 8 and 12 have a better oil retention than that of the example 16, because the area rate A is equal to or higher than 40%. Consequently, the examples 4, 8 and 12 have an excellent seizure resistance, as compared with the example 16. The same is true of a comparison between the examples 3, 7 and 11 and the example 15; between the examples 2, 6 and 10 and the example 14; and between the examples 1, 5 and 9 and the example 13. From this, it can be seen that in order to enhance the seizure resistance, the area rate A may be set in a range of A≧40%, if the P content is constant.

Therefore, it can be concluded that it is required for the slide surface construction 4 capable of withstanding a severe sliding environment to have requirements of an area rate A≧40% and an P content≧0.04% by weight. These requirements are satisfied by the examples 3, 4, 7, 8, 11 and 12. Consequently, the seizure generating surface pressure for these examples is equal to or larger than 1500N and remarkably high, as compared with those of the other examples. (Ic) Slide surface construction containing oxygen and phosphorus A piston pin 1 for an internal combustion engine was produced by subjecting an outer peripheral surface 3 of a pipe-like substrate 2 made of a steel (JIS SCM420) to an electrolytic Fe-plating process to form a slide surface construction 4 formed of an aggregate of Fe crystals and having a thickness of 15 μm.

Table 20 shows conditions for the electrolytic Fe-plating process for example 1 of the slide surface construction. The plating time was set at 15 minutes, and the amount of liquid replenisher supplied was set at 0.5 liters/min.

TABLE 20

| Slide surface construction | Plating bath | | | | Pulse current process | | | |
|---|---|---|---|---|---|---|---|---|
| | Composition (g/liter) | | | | | | | |
| | Ferrous sulfate | Sodium hypophosphite | pH | Temperature (°C.) | CDmax (A/dm$^2$) | CDm (A/dm$^2$) | $T_{ON}/T_C$ | $T_{ON}$ (msec) |
| Example 1 | 400 | 0.8 | 6 | 45 | 20 | 4 | 0.2 | 2 |

Table 21 shows the crystal form of the slide surface, the area rate A and grain size of the hexagonal pyramid-shaped Fe crystals in the slide surface, the content S of the oriented Fe crystals, the O content, the P content and the hardness of a section of the slide surface construction for the example.

TABLE 21

| Slide surface construction | Crystal form of slide surface | Hexagonal pyramid-shaped Fe crystals | | Content S (%) of oriented Fe crystals | | | | | O content (% by weight) | P content (% by weight) | Hardness HmV |
|---|---|---|---|---|---|---|---|---|---|---|---|
| | | Area rate A (%) | Grain size (μm) | {110} | {200} | {211} | {310} | {222} | | | |
| Example 1 | Hexagonal pyramid-shaped | 90 | 0.5–3 | 1.7 | 0.5 | 5 | 1.6 | 91.2 | 0.2 | 0.04 | 465 |

The area rate A, the grain size and the content S were determined in the same manner as in section (Ia) above. The O content was determined in the same manner as in section (Ia), and the P content was determined in the same manner as in section (Ib).

As can be seen from the comparison of the example 1 in Table 21 with the example 3 in Table 6 and the example 3 in Table 15, if the slide surface construction contains both oxygen (O) and phosphorus (P) in contents in a range of O≧0.2% by weight and in a range of P≧0.04% by weight, respectively, the hardness is increased more than that of the slide surface construction containing only oxygen or phosphorus.

Then, chips of the example were fabricated and subjected to a seizure test in a chip-on-disk manner under lubrication to measure the seizure generating load. The result showed a seizure generating load of 2500N. Conditions for the seizure test are identical to those described in section (Ia).

As can be seen from the comparison of this example 1 with the example 3 in Table 10 and the example 3 in Table 19, the example 1 has a seizure resistance superior to the examples 3 in Tables 10 and 19, as a result of increasing of the hardness.

Of course, it is required that the area rate A of the hexagonal pyramid-shaped Fe crystals in the slide surface is in a range of A≧40% even with the slide surface construction containing both of oxygen (O) and phosphorus (P), as described above.

Second Embodiment

The second embodiment will be described as for a slide surface construction, which is formed of an aggregate of Fe crystals. In this slide surface construction, a large number of hexagonal pyramid-shaped Fe crystals exist in a slide surface, and the aggregate contains at least one of oxygen (O) and phosphorus (P), and at least one of hydrogen (H) and carbon (C). (IIa) Slide surface construction containing oxygen (O) and at least one of hydrogen (H) and carbon (C)

A plurality of piston pins 1 for an internal combustion engine were produced by subjecting an outer peripheral surface 3 of pipe-like substrate 2 made of a steel (JIS SCM420) to an electrolytic Fe-plating process to form a slide surface construction 4 formed of an aggregate of Fe crystals and having a thickness of 15 μm.

Table 22 shows conditions for the electrolytic Fe-plating process for examples 1 to 3 of the slide surface constructions. The plating time was varied within a range of 5 to 60 minutes in order to set the thickness of the examples 1 to 3 at 15 μm, as described above. The amount of liquid replenisher supplied was set at 0.5 liters/min.

TABLE 22

| Slide surface construction | Plating bath | | | | Pulse current process | | | |
|---|---|---|---|---|---|---|---|---|
| | Composition (g/liter) | | | Temperature (°C.) | CDmax (A/dm$^2$) | CDm (A/dm$^2$) | $T_{ON}/T_C$ | $T_{ON}$ (msec) |
| | Ferrous sulfate | Saccharine | pH | | | | | |
| Example 1 | 400 | 0 | 6.5 | 45 | 20 | 4 | 0.2 | 2 |
| Example 2 | 400 | 0.75 | 6.5 | 50 | 40 | 8 | 0.2 | 2 |
| Example 3 | 400 | 0.75 | 6.5 | 45 | 40 | 8 | 0.2 | 2 |

Table 23 shows the crystal form of the slide surface, the area rate A and grain size of the hexagonal pyramid-shaped Fe crystals in the slide surface, the content (amount present) S of the oriented Fe crystals, the O content, H content, the C content and the hardness of the section of the slide surface construction for the examples 1 to 3 of the slide surface constructions.

TABLE 23

| Slide surface construction | Crystal form of slide surface | Hexagonal pyramid-shaped Fe crystals | | Content S (%) of oriented Fe crystals | | | | | O content (% by weight) | H content (% by weight) | C content (% by weight) | Hardness HmV |
|---|---|---|---|---|---|---|---|---|---|---|---|---|
| | | Area rate A (%) | Grain size (μm) | {110} | {200} | {211} | {310} | {222} | | | | |
| Example 1 | Hexagonal pyramid-shaped | 90 | 1–2 | 0.6 | 2.3 | 5.2 | 1.9 | 90 | 0.2 | 0.01 | very small | 430 |
| Example 2 | Hexagonal pyramid-shaped | 90 | 1–2 | 0.8 | 1.1 | 5.7 | 2.1 | 90.3 | 0.2 | very small | 0.03 | 430 |
| Example 3 | Hexagonal pyramid-shaped | 90 | 0.5–3 | 0.4 | 1.2 | 4.9 | 1.7 | 91.8 | 0.2 | 0.01 | 0.03 | 460 |

The area rate A, the grain size, the content S and the O content were determined in the same manner as in section (Ia) above. The measurement of the H content was carried out by a procedure which comprises peeling-off each of the examples 1 to 3 from the substrate 2 and then subjecting each example to an analysis according to an inert gas melting/thermal conductimetry (JIS Z2614). The measurement of the C content was carried out by a procedure which comprises peeling-off each of the examples 1 to 3 from the substrate 2 and then subjecting each example to an analysis according to an infrared absorptiometry (JIS G1211). The term "very small" for the H content in Table 23 indicates, for example, about 0.005% by weight, and the term "very small" for the C content in Table 23 indicates, for example, about 0.008% by weight. The same is true of Tables which will be described hereinafter.

As can be seen from the comparison of the examples 1 to 3 in Table 23 with the example 3 in Table 6, if the H and C contents are set in ranges of H≧0.01% by weight and C≧0.03% by weight, respectively when O≧0.2% by weight, the hardness is increased more than that of the slide surface construction containing only oxygen (O). It can be also seen from Table 23 that the example 3 containing O, H and C has the highest hardness.

Then, chips of the examples 1 to 3 were fabricated and subjected to a seizure test in a chip-on-disk manner under lubrication to measure the seizure generating load, thereby providing the results given in Table 24. Conditions for the seizure test are identical to those described in the item (Ia).

TABLE 24

| Slide surface construction | Seizure generating load (N) |
|---|---|
| Example 1 | 2150 |
| Example 2 | 2200 |
| Example 3 | 2400 |

Figure 20:
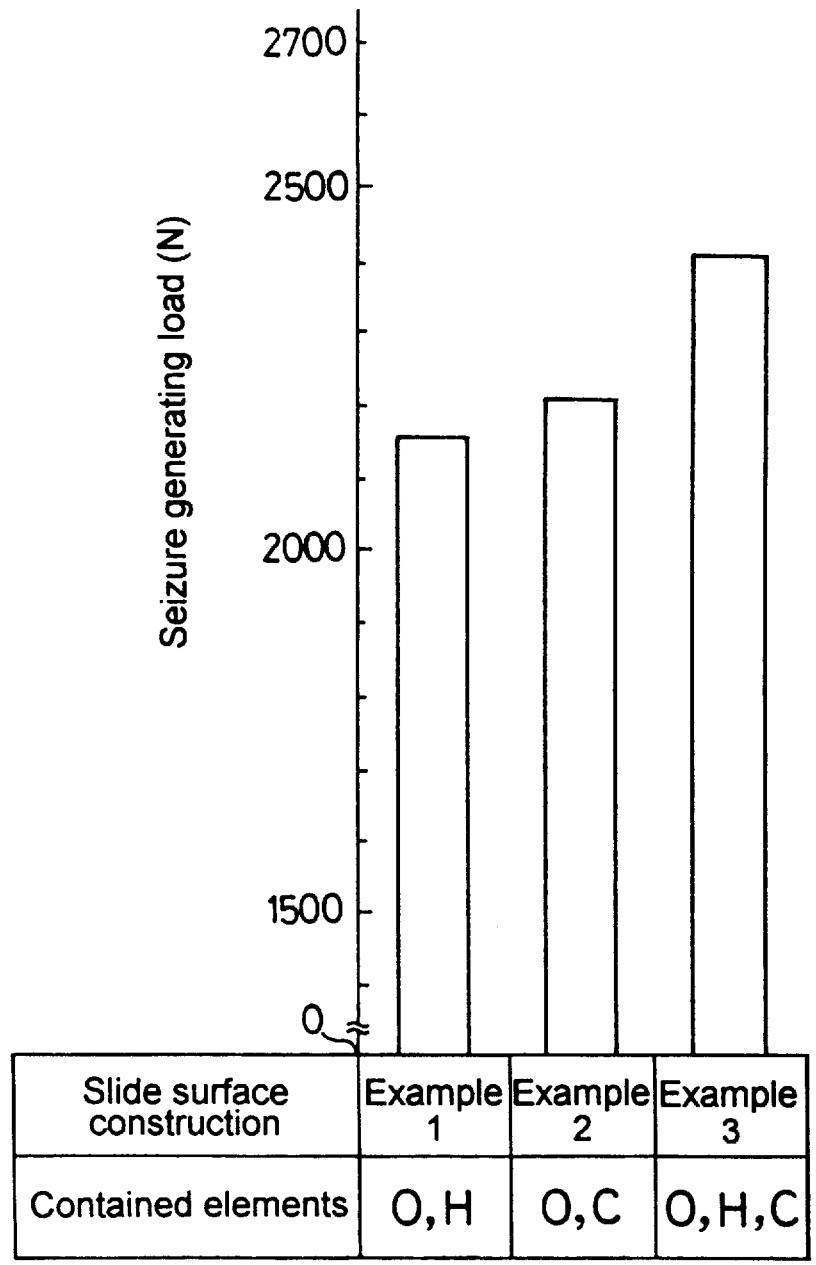
FIG. 20 is a graph illustrating a first example of the relationship between elements contained and the seizure generating load.

FIG. 20 is a graph illustrating the relationship between the contained elements and the seizure generating load for the examples 1 to 3. As is apparent from Table 24 and FIG. 20, for the examples 1 to 3, the seizure generating load is largely increased with such an increase in hardness as described above, as compared with the example 3 in Table 10. The example 2 containing oxygen (O) and carbon (C) has a seizure resistance superior to the example 1 containing oxygen (O) and hydrogen (H). Further, the seizure generating load for the example 3 containing oxygen (O), hydrogen (H) and carbon (C) is highest.

Then, a disk of the example 1 was fabricated and subjected to a sliding test in a chip-on-disk manner under lubrication. Conditions for the sliding test are as follows: The material for the chip was JIS FC250; the material for the disk was Al—Si (10% by weight) alloy; the peripheral speed of the disk was 15 m/sec; the amount of oil supplied was 40 cc/min; the area of the slide surface of the chip was 2 cm$^2$; and the pressure on the chip was 10 MPa.

Figure 21:
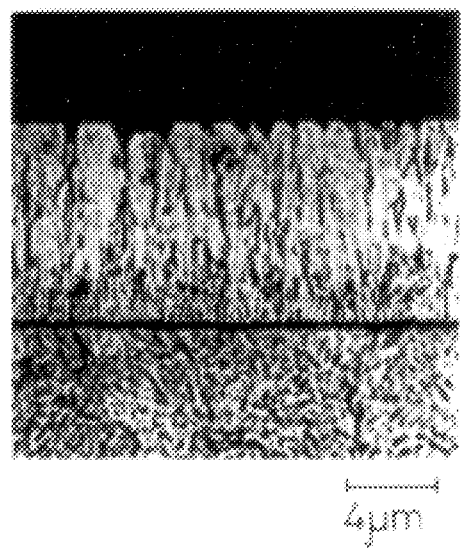
FIG. 21 is a photomicrograph showing the crystal structure of a vertical section of an example 1 after a sliding test.

FIG. 21 is a photomicrograph showing the crystal structure of a vertical section of the example after being subjected to the sliding test. As is apparent from FIG. 21, for the example 1, the area rate A of the hexagonal pyramid-shaped Fe crystals is equal to 90%, and the H content is equal to 0.01% by weight. Therefore, tip ends of the hexagonal pyramid-shaped Fe crystals are sheared and worn into a trapezoidal shape. Thus, the surface-on-surface sliding is permitted to occur and hence, the friction coefficient $\mu$ is reduced, thereby providing an excellent sliding characteristic.

Of course, even for the slide surface construction containing at least one of oxygen (O), hydrogen (H) and carbon (C), as described above, it is required that the area rate A of the hexagonal pyramid-shaped Fe crystals in the slide surface is equal to or higher than 40%. (IIb) Slide surface construction containing at least one of phosphorus (P), hydrogen (H) and carbon (C)

A plurality of piston pins 1 for an internal combustion engine were produced by subjecting an outer peripheral surface 3 of a pipe-like substrate 2 made of a steel (JIS SCM420) to an electrolytic Fe-plating process to form a slide surface construction 4 formed of an aggregate of Fe crystals and having a thickness of 15 $\mu$m.

Table 25 shows conditions for the electrolytic Fe-plating process for examples of the slide surface constructions. The plating time was varied within a range of 5 to 60 minutes in order to set the thickness of the examples 1 to 3 at 15 $\mu$m, as described above. The amount of liquid replenisher supplied was set at 0.5 liters/min.

TABLE 25

| | Plating bath | | | | | Pulse current process | | | |
|---|---|---|---|---|---|---|---|---|---|
| | Composition (g/liter) | | | | | | | | |
| Slide surface construction | Ferrous sulfate | Sodium hypo-phosphite | Saccharine | pH | Tempera-ture (°C.) | CDmax (A/dm$^2$) | CDm (A/dm$^2$) | $T_{ON}/T_C$ | $T_{ON}$ (msec) |
| Example 1 | 400 | 0.8 | 0 | 6.3 | 48 | 20 | 4 | 0.2 | 2 |
| Example 2 | 400 | 0.5 | 0.75 | 6.3 | 50 | 40 | 8 | 0.2 | 2 |
| Example 3 | 400 | 0.5 | 0.75 | 6.3 | 48 | 40 | 8 | 0.2 | 2 |

Table 26 shows the crystal form of the slide surface, the area rate A and grain size of the hexagonal pyramid-shaped Fe crystals in the slide surface, the content (amount present) S of the oriented Fe crystals, the P content, the H content, the C content and the hardness of a section of the slide surface construction for the examples 1 to 3 of slide surface constructions.

TABLE 26

| Slide surface construction | Crystal form of slide surface | Hexagonal pyramid-shaped Fe crystals | | Content S (%) of oriented Fe crystals | | | | | P content (% by weight) | H content (% by weight) | C content (% by weight) | Hardness HmV |
|---|---|---|---|---|---|---|---|---|---|---|---|---|
| | | Area rate A (%) | Grain size ($\mu$m) | {110} | {200} | {211} | {310} | {222} | | | | |
| Example 1 | Hexagonal pyramid-shaped | 90 | 0.5–3 | 2.7 | 0.2 | 4.4 | 1.5 | 91.2 | 0.04 | 0.01 | very small | 450 |
| Example 2 | Hexagonal pyramid-shaped | 90 | 0.5–3 | 2.7 | 0.1 | 4.5 | 1.7 | 91 | 0.04 | very small | 0.03 | 455 |
| Example 3 | Hexagonal pyramid-shaped | 90 | 0.5–3 | 2.5 | 0.4 | 4.6 | 1.7 | 90.8 | 0.04 | 0.01 | 0.03 | 470 |

As is apparent from the comparison of the examples 1 to 3 in Table 26 with the example 3 in Table 15, if the H content and/or the C content are set in ranges of H≧0.01% by weight and C≧0.03% by weight when P≧0.04% by weight, the hardness is increased more than that of the slide surface construction containing only phosphorus. It is also apparent from Table 26 that the example 2 containing phosphorus (P) and carbon (C) has a higher hardness than that of the example 1 containing phosphorus (P) and hydrogen (H), and that the example 3 containing phosphorus (P), hydrogen (H) and carbon (C) has the highest hardness.

Then, chips of the examples 1 to 3 were fabricated and subjected to a seizure test in a chip-on-disk manner under lubrication to measure the seizure generating load, thereby providing the results given in Table 27. Conditions for the seizure test are identical to those described in section (Ia).

TABLE 27

| Slide surface construction | Seizure generating load (N) |
|---|---|
| Example 1 | 2250 |
| Example 2 | 2300 |
| Example 3 | 2500 |

Figure 22:
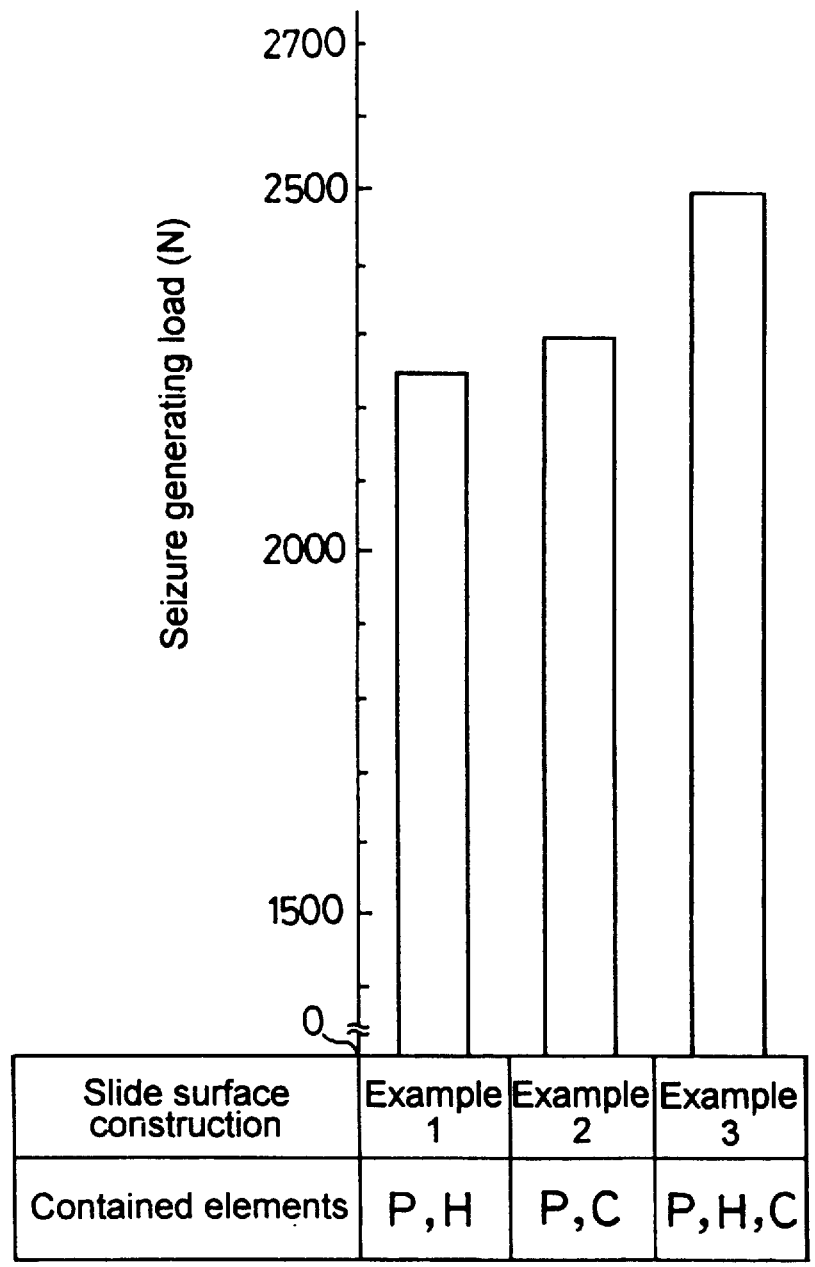
FIG. 22 is a graph illustrating a second example of the relationship between elements contained and the seizure generating load.

FIG. 22 is a graph illustrating the relationship between the contained elements and the seizure generating load for the examples 1 to 3. As is apparent from Table 27 and FIG. 22, for the examples 1 to 3, the seizure generating load is largely increased with such an increase in hardness described above, as compared with the example 3 in Table 19. The example 2 containing phosphorus (P) and carbon (C) has a seizure resistance superior to the example 1 containing phosphorus (P) and hydrogen (H), and the seizure generating load for the example 3 containing phosphorus (P), hydrogen (H) and carbon (C) is the highest.

Of course, even for the slide surface construction containing at least one of phosphorus (P), hydrogen (H) and carbon (C), as described above, it is required that the area rate A of the hexagonal pyramid-shaped Fe crystals in the slide surface is equal to or higher than 40%. (IIc) Slide surface construction containing oxygen (O) and phosphorus (P), and at least one of hydrogen (H) and carbon (C)

A plurality of piston pins 1 for an internal combustion engine were produced by subjecting an outer peripheral surface 3 of a pipe-like substrate 2 made of a steel (JIS SCM420) to an electrolytic Fe-plating process to form a slide surface construction 4 formed of an aggregate of Fe crystals and having a thickness of 15 $\mu$m.

Table 28 shows conditions for the electrolytic Fe-plating process for examples 1 to 3 of the slide surface constructions 4. The plating time was varied within a range of 5 to 60 minutes in order to set the thickness of the examples 1 to 3 at 15 $\mu$m, as described above. The amount of liquid replenisher supplied was set at 0.5 liters/min.

TABLE 28

| | Plating bath | | | | | Pulse current process | | | |
|---|---|---|---|---|---|---|---|---|---|
| | Composition (g/liter) | | | | | | | | |
| Slide surface construction | Ferrous sulfate | Sodium hypo-phosphite | Saccharine | pH | Temperature (°C.) | CDmax (A/dm$^2$) | CDm (A/dm$^2$) | T$_{ON}$/T$_C$ | T$_{ON}$ (msec) |
| Example 1 | 400 | 0.8 | 0 | 6.5 | 45 | 20 | 4 | 0.2 | 2 |
| Example 2 | 400 | 0.5 | 0.75 | 6.5 | 50 | 40 | 8 | 0.2 | 2 |
| Example 3 | 400 | 0.5 | 0.75 | 6.5 | 45 | 40 | 8 | 0.2 | 2 |

Table 29 shows the crystal form of the slide surface, the area rate A and grain size of the hexagonal pyramid-shaped Fe crystals in the slide surface, the content (amount present) S of the oriented Fe crystals, the O content, the P content, the H content, the C content and the hardness of a section of the slide surface construction for the examples 1 to 3 of slide surface constructions.

TABLE 29

| Slide surface construction | Crystal form of slide surface | Hexagonal pyramid-shaped Fe crystals | | Content S (%) of oriented Fe crystals | | | | | O content (% by weight) | P content (% by weight) | H content (% by weight) | C content (% by weight) | Hardness HmV |
|---|---|---|---|---|---|---|---|---|---|---|---|---|---|
| | | Area rate A (%) | Grain size ($\mu$m) | {110} | {200} | {211} | {310} | {222} | | | | | |
| Example 1 | Hexagonal pyramid-shaped | 90 | 0.5–3 | 2 | 0.4 | 5.2 | 1.5 | 90.9 | 0.2 | 0.04 | 0.01 | very small | 480 |
| Example 2 | Hexagonal pyramid-shaped | 90 | 0.5–3 | 1.7 | 0.7 | 4.6 | 1.7 | 91.3 | 0.2 | 0.04 | very small | 0.03 | 485 |

TABLE 29-continued

| Slide surface construction | Crystal form of slide surface | Hexagonal pyramid-shaped Fe crystals | | Content S (%) of oriented Fe crystals | | | | | O content (% by weight) | P content (% by weight) | H content (% by weight) | C content (% by weight) | Hardness HmV |
|---|---|---|---|---|---|---|---|---|---|---|---|---|---|
| | | Area rate A (%) | Grain size (μm) | {110} | {200} | {211} | {310} | {222} | | | | | |
| Example 3 | Hexagonal pyramid-shaped | 90 | 0.5–2 | 2.3 | 0.5 | 4.9 | 1.7 | 90.6 | 0.2 | 0.04 | 0.01 | 0.03 | 510 |

The area rate A, the grain size and the content S were determined in the same manner as in section (Ia) above. The O content was determined in the same manner as in section (Ia); the P content was determined in the same manner as in section (Ib), and the H and C contents were determined in the same manner as in section (IIa).

As is apparent from the comparison of the examples 1 to 3 in Table 29 with the example 1 in Table 21, if the H content and/or the C content are set in ranges of $H \geqq 0.01\%$ by weight and $C \geqq 0.03\%$ by weight when $O \geqq 0.2\%$ by weight, and $P \geqq 0.04\%$ by weight, the hardness is increased more than that of the slide surface construction containing oxygen (O) and phosphorus (P) in those ranges. It is also apparent from Table 29 that the example 2 containing oxygen (O), phosphorus (P) and carbon (C) has a higher hardness than that of the example 1 containing oxygen (O), phosphorus (P) and hydrogen (H), and the example 3 containing oxygen (O), phosphorus (P), hydrogen (H) and carbon (C) has the highest hardness.

Then, chips of the examples 1 to 3 were fabricated and subjected to a seizure test in a chip-on-disk manner under lubrication to measure the seizure generating load, thereby providing the results given in Table 30. Conditions for the seizure test are identical to those in section (Ia).

TABLE 30

| Slide surface construction | Seizure generating load (N) |
|---|---|
| Example 1 | 2600 |
| Example 2 | 2650 |
| Example 3 | 2900 |

Figure 23:
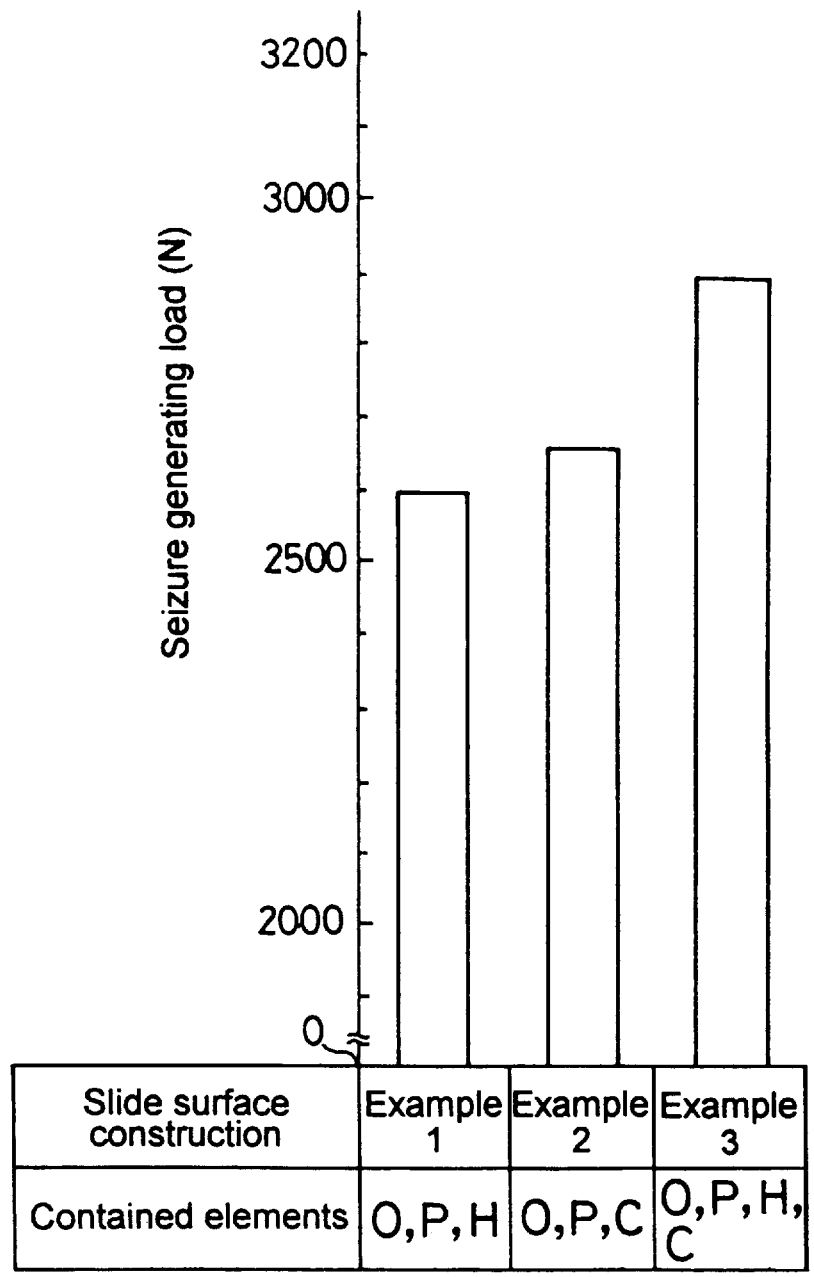
FIG. 23 is a graph illustrating a third example of the relationship between elements contained and the seizure generating load.

FIG. 23 is a graph illustrating the relationship between the contained elements and the seizure generating load for the examples 1 to 3. As is apparent from Table 30 and FIG. 23, for the examples 1 to 3, the seizure generating load is largely increased with such an increase in hardness described above, as compared with the example 1 described in section (Ic). The example 2 containing oxygen (O), phosphorus (P) and carbon (C) has a seizure resistance superior to the example 1 containing oxygen (O), phosphorus (P) and hydrogen (H), and the seizure generating load for the example 3 containing oxygen (O), phosphorus (P), hydrogen (H) and carbon (C) is the highest.

Of course, even for the slide surface construction containing at least one of oxygen (O), phosphorus (P), and at least one of hydrogen (H) and carbon (C), as described above, it is required that the area rate A of the hexagonal pyramid-shaped Fe crystals in the slide surface is equal to or higher than 40%.

Third Embodiment

The third embodiment will be described as for a slide surface construction, which is formed of an aggregate of Fe crystals. In this slide surface construction, the aggregate has a large number of columnar Fe crystals which are grown from a substrate and whose tip ends are formed of hexagonal pyramid-shaped Fe crystals. The hexagonal pyramid-shaped Fe crystals exist in the slide surface, and further, the aggregate contains at least one of oxygen (O) and phosphorus (P), and boron (B).

A plurality of piston pins 1 for an internal combustion engine were produced by subjecting an outer peripheral surface 3 of pipe-like substrate 2 made of a steel (JIS SCM420) to an electrolytic Fe-plating process to form a slide surface construction 4 formed of an aggregate of Fe crystals and having a thickness of 20 μm.

Table 31 shows conditions for the electrolytic Fe-plating process for examples 1 to 3 of the slide surface constructions. The plating time was varied within a range of 10 to 60 minutes in order to set the thickness of the examples 1 to 3 at 20 μm, as described above. The amount of liquid replenisher supplied was set at 0.5 liters/min.

TABLE 31

| | Plating bath | | | | | Pulse current process | | | |
|---|---|---|---|---|---|---|---|---|---|
| | Composition (g/liter) | | | | | | | | |
| Slide surface construction | Ferrous sulfate | Boric Acid | Sodium hypophosphite | pH | Temperature (°C.) | CDmax (A/dm$^2$) | CDm (A/dm$^2$) | $T_{ON}/T_C$ | $T_{ON}$ (msec) |
| Example 1 | 400 | 1.5 | 0 | 6.5 | 50 | 20 | 4 | 0.2 | 2 |
| Example 2 | 400 | 1.5 | 0.8 | 6.3 | 50 | 20 | 4 | 0.2 | 2 |
| Example 3 | 400 | 1.5 | 0.8 | 6.5 | 50 | 20 | 4 | 0.2 | 2 |

Table 32 shows the crystal form of the slide surface, the area rate A and grain size of the hexagonal pyramid-shaped Fe crystals in the slide surface, the content S (which indicates the amount present) of oriented Fe crystals, the O content, the P content, the B content and the hardness of a section of the slide surface construction for the examples 1 to 3.

As a result, it was made clear that the example 1 in Table 32 had a tensile strength of 410 MPa, while the example 3 in Table 6 had a tensile strength of 275 MPa, and that the

TABLE 32

| Slide surface construction | Crystal form of slide surface | Hexagonal pyramid-shaped Fe crystals | | Content S (%) of oriented Fe crystals | | | | | O content (% by weight) | P content (% by weight) | B content (% by weight) | Hardness HmV |
|---|---|---|---|---|---|---|---|---|---|---|---|---|
| | | Area rate A (%) | Grain size (μm) | {110} | {200} | {211} | {310} | {222} | | | | |
| Example 1 | Hexagonal pyramid-shaped | 90 | 0.5–2 | 0.9 | 1.8 | 5.1 | 1.8 | 90.4 | 0.2 | very small | 0.01 | 420 |
| Example 2 | Hexagonal pyramid-shaped | 90 | 0.5–3 | 2.5 | 0.3 | 4.8 | 1.5 | 90.9 | very small | 0.04 | 0.01 | 445 |
| Example 3 | Hexagonal pyramid-shaped | 90 | 0.5–3 | 2.3 | 0.4 | 4.6 | 1.4 | 91.3 | 0.2 | 0.04 | 0.01 | 470 |

The area rate A, the grain size and the content S were determined in the same manner as in section (Ia) above. The O content was determined in the same manner as in section (Ia), and the P content was determined in the same manner as in section (Ib). The measurement of the B content was carried out by a procedure which comprises peeling-off each of the examples 1 to 3 from the substrate 2 and then subjecting each example to an analysis according to a curcumin absorptiometry (JIS G1227). The term "very small" for the O content in Table 32 indicates, for example, about 0.02% by weight, and the term "very small" for the P content in Table 32 indicates, for example, about 0.01% by weight.

Figure 24:
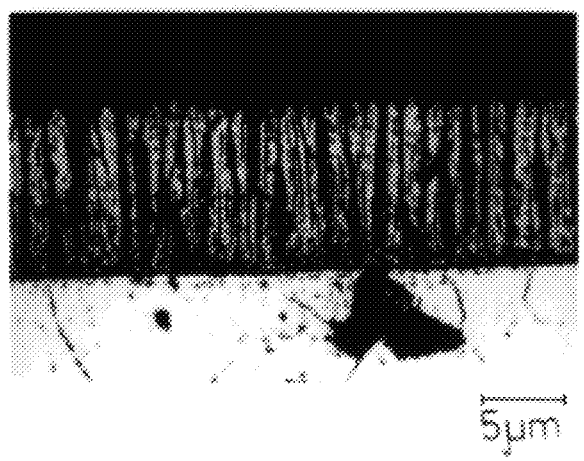
FIG. 24 is a photomicrograph showing the crystal structure of the vertical section of another example 1.
Figure 25:
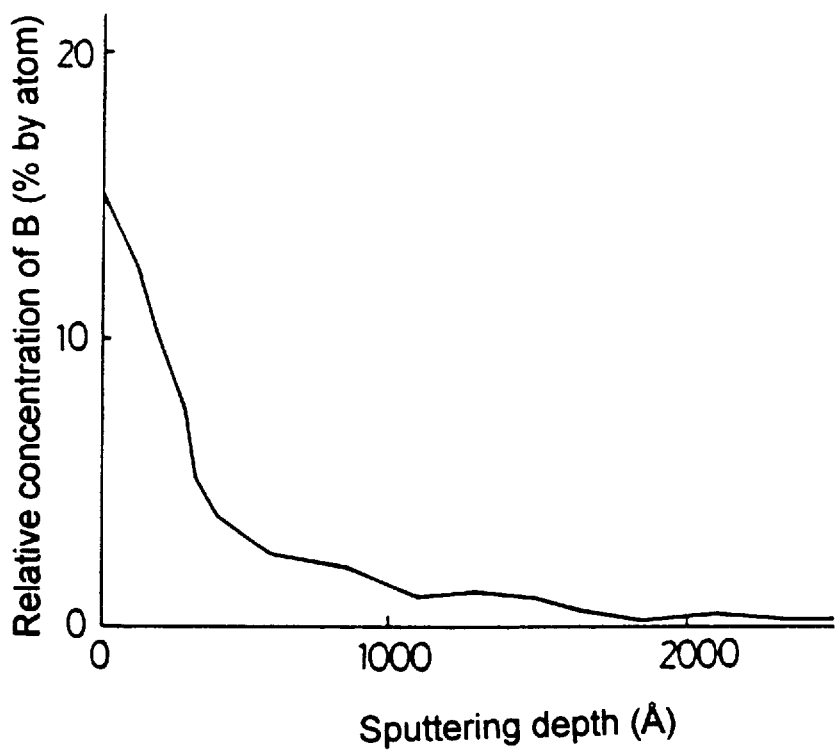
FIG. 25 is a graph illustrating the relationship between the sputtering depth and the related density of B.

FIG. 24 is a photomicrograph showing the crystal structure of a vertical section of the example 1, wherein a large number of columnar Fe crystals are observed. FIG. 25 shows results provided by an analysis carried out according to an Auger electron spectrometry (AES). The analysis was carried out by sampling one columnar Fe crystal from the example, and applying fast electron beams to a side of the columnar Fe crystal to measure a concentration of B in a depthwise direction. It can be seen from FIG. 25 that the concentration of B is higher in the side of the columnar Fe crystal and therefore, boron (B) was preferentially precipitated at a grain boundary between the columnar Fe crystals.

As is apparent from the comparison of the example 1 in Table 32 with the example 3 in Table 6, the example 2 in Table 32 with the example 3 in Table 15, and the example 3 in Table 32 with the example 1 in Table 21, if the B content is set in a range of B≧0.01% by weight when O content≧0.2% by weight and/or P content≧0.04% by weight, the grain size of the columnar Fe crystals is decreased, and the hardness is increased more than that of the slide surface construction which does not contain boron (B).

Further, the example 1 in Table 32 and the example 3 in Table 6 having the same O content were subjected to a tensile test which will be described below. The examples 1 and 3 were peeled off from the substrates, and a tension load was applied to the examples 1 and 3 in a direction intersecting a direction of growth of the columnar Fe crystals. A test piece had a length in such intersecting direction of 50 mm, a width of 40 mm and a thickness of 20 μm.

increase in strength of the example 1 in Table 32 was achieved by the precipitation of boron (B) at the grain boundary.

Then, chips of the examples 1 to 3 were fabricated and subjected to a seizure test in a chip-on-disk manner under lubrication to measure the seizure generating load, thereby providing the results given in Table 33. Conditions for the seizure test were identical to those described in section (Ia).

TABLE 33

| Slide surface construction | Seizure generating load (N) |
|---|---|
| Example 1 | 2100 |
| Example 2 | 2200 |
| Example 3 | 2550 |

Figure 26:
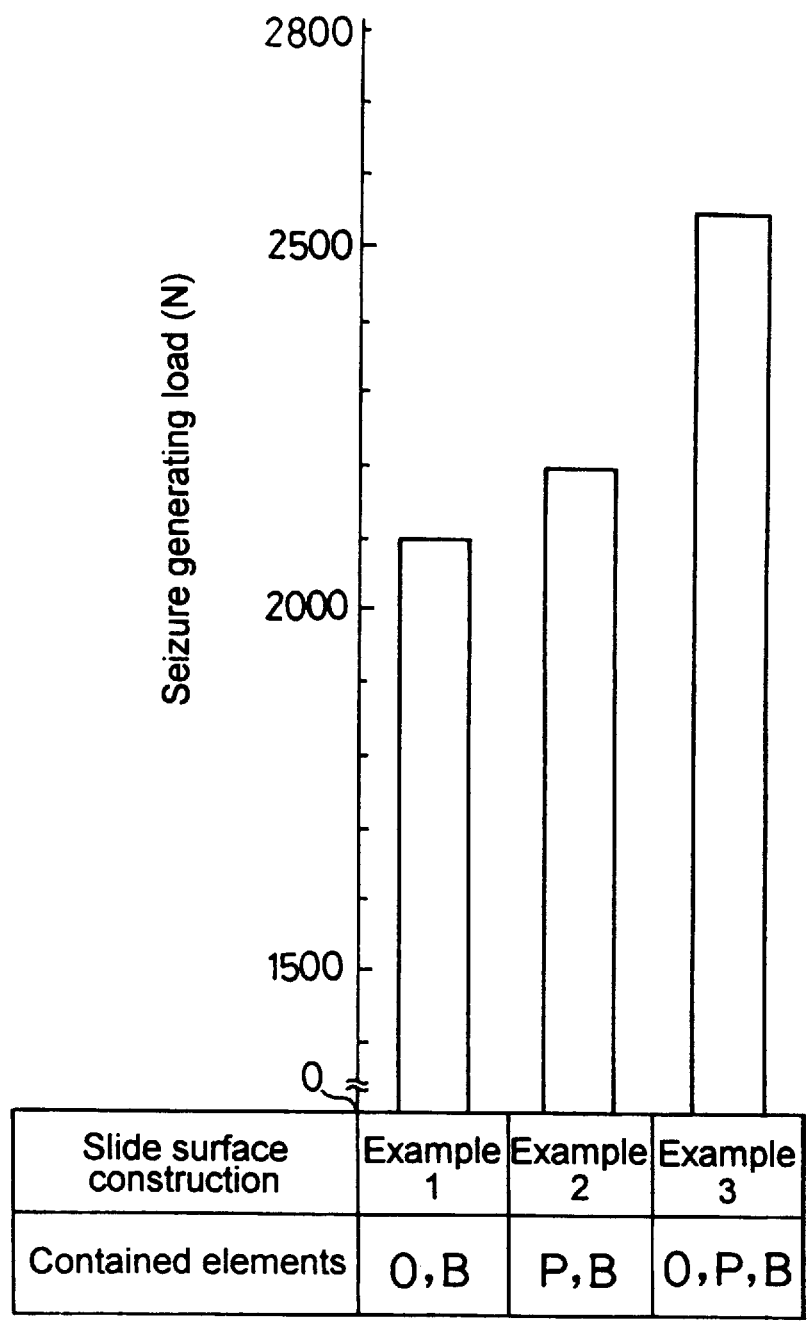
FIG. 26 is a graph illustrating a fourth example of the relationship between elements contained and the seizure generating load.

FIG. 26 is a graph illustrating the relationship between the contained elements and the seizure generating load for the examples 1 to 3. As is apparent from Table 33 and FIG. 26, the seizure generating load for the examples 1 to 3 is largely increased with an increase in hardness, as described above, as compared with the example 3 in Table 10, the example 3 in Table 19 and the example 1 in section (Ic), respectively. In addition, the example 2 containing phosphorus (P) and boron (B) has a seizure resistance superior to the example 1 containing oxygen (O) and boron (B), and the seizure generating load for the example 3 containing oxygen (O), phosphorus (P) and boron (B) is the highest.

Of course, it is required that the area rate A of the hexagonal pyramid-shaped Fe crystals in the slide surface is in a range of A≧40% even with the slide surface construction containing at least one of oxygen (O) and phosphorus (P), and boron (B), as described above.

Fourth Embodiment

The fourth embodiment will be described as for a slide surface construction, which is formed of an aggregate of Fe crystals. In this slide surface construction, the aggregate has a large number of columnar Fe crystals which are grown from a substrate and whose tip ends are formed of hexagonal pyramid-shaped Fe crystals, and the hexagonal pyramid-shaped Fe crystals exist in the slide surface. Further, the aggregate contains at least one of oxygen (O) and phosphorus (P), boron (B) and at least one of hydrogen (H) and carbon (C).

(IVa) Slide surface construction containing oxygen (O), boron (B), and at least one of hydrogen (H) and carbon (C)

A plurality of piston pins 1 for an internal combustion engine were produced by subjecting an outer peripheral surface 3 of a pipe-like substrate 2 made of a steel (JIS SCM420) to an electrolytic Fe-plating process to form a slide surface construction 4 formed of an aggregate of Fe crystals and having a thickness of 20 $\mu$m.

Table 34 shows conditions for the electrolytic Fe-plating process for examples 1 to 3 of the slide surface constructions. The plating time was varied within a range of 10 to 60 minutes in order to set the thickness of the examples 1 to 3 at 20 $\mu$m, as described above. The amount of liquid replenisher supplied was set at 0.5 liters/min.

Then, chips of the examples 1 to 3 were fabricated and subjected to a seizure test in a chip-on-disk manner under lubrication to measure the seizure generating load, thereby providing the results given in Table 36. Conditions for the seizure test are identical to those described in section (Ia).

TABLE 36

| Slide surface construction | Seizure generating load (N) |
|---|---|
| Example 1 | 2300 |
| Example 2 | 2450 |
| Example 3 | 2600 |

TABLE 25

| Slide surface construction | Plating bath | | | | | Pulse current process | | | |
|---|---|---|---|---|---|---|---|---|---|
| | Composition (g/liter) | | | | | | | | |
| | Ferrous sulfate | Boric Acid | Saccharine | pH | Temperature (°C.) | CDmax (A/dm²) | CDm (A/dm²) | $T_{ON}/T_C$ | $T_{ON}$ (msec) |
| Example 1 | 400 | 1.5 | 0 | 6.5 | 45 | 20 | 4 | 0.2 | 2 |
| Example 2 | 400 | 1.5 | 0.75 | 6.5 | 50 | 40 | 8 | 0.2 | 2 |
| Example 3 | 400 | 1.5 | 0.75 | 6.5 | 45 | 40 | 8 | 0.2 | 2 |

Table 35 shows the crystal form of the slide surface, the area rate A and grain size of the hexagonal pyramid-shaped Fe crystals in the slide surface, the content (amount present) S of the oriented Fe crystals, the O content, the B content, the H content, the C content, and the hardness of the section of the slide surface construction for the examples 1 to 3 of the slide surface constructions.

Figure 27:
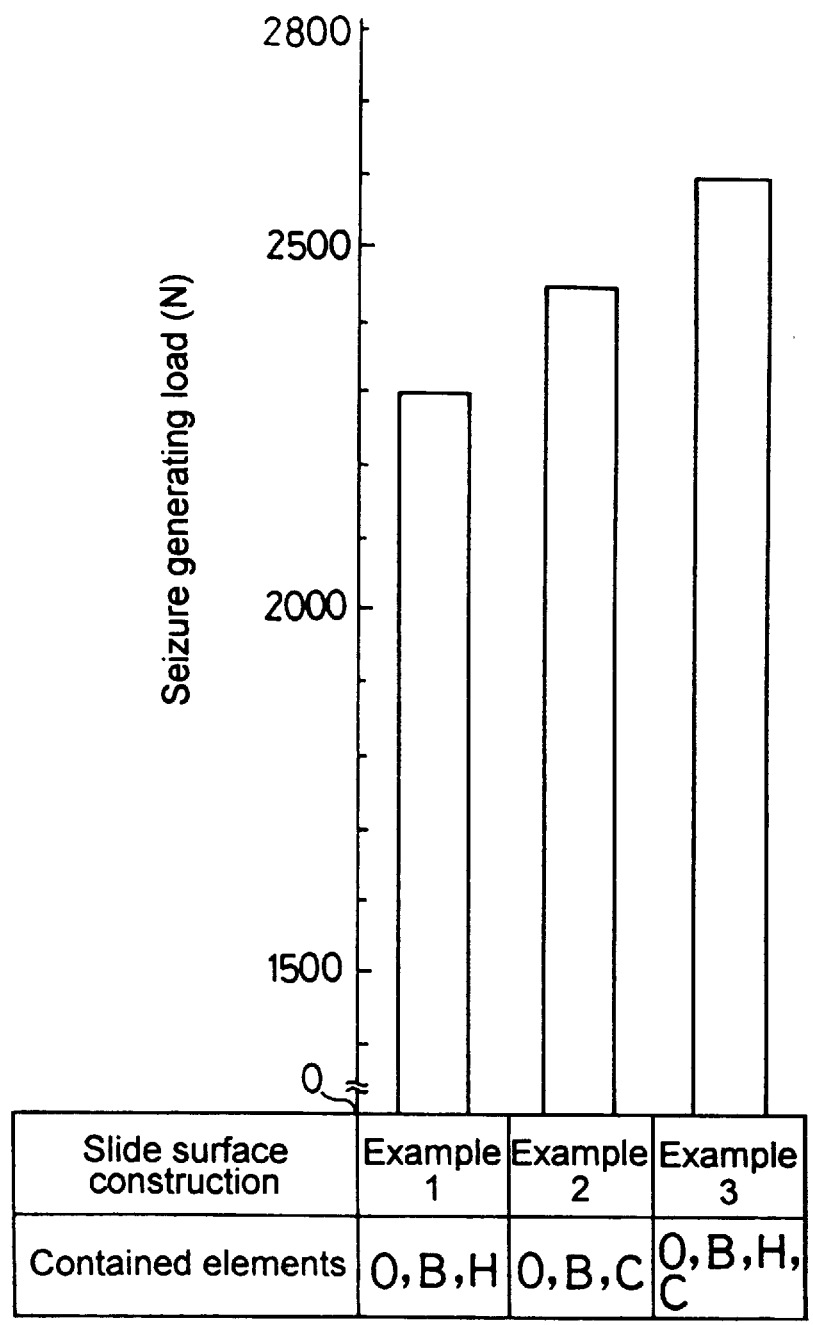
FIG. 27 is a graph illustrating a fifth example of the relationship between elements contained and the seizure generating load.

FIG. 27 is a graph illustrating the relationship between the contained elements and the seizure generating load for the examples 1 to 3. As is apparent from Table 36 and FIG. 27, the seizure generating load for the examples 1 to 3 is largely increased with an increase in hardness, as described above, as compared with the example 1 in Table 33. In addition, the example 2 containing oxygen (O), boron (B) and carbon (C)

TABLE 35

| Slide surface construction | Crystal form of slide surface | Hexagonal pyramid-shaped Fe crystals | | Content S (%) of oriented Fe crystals | | | | | O content (% by weight) | B content (% by weight) | H content (% by weight) | C content (% by weight) | Hardness HmV |
|---|---|---|---|---|---|---|---|---|---|---|---|---|---|
| | | Area rate A (%) | Grain size ($\mu$m) | {110} | {200} | {211} | {310} | {222} | | | | | |
| Example 1 | Hexagonal pyramid-shaped | 90 | 0.5–2 | 0.8 | 0.7 | 5.3 | 2.5 | 90.7 | 0.2 | 0.01 | 0.01 | very small | 450 |
| Example 2 | Hexagonal pyramid-shaped | 90 | 0.5–2 | 0.6 | 1.4 | 5.1 | 1.7 | 91.2 | 0.2 | 0.01 | very small | 0.03 | 460 |
| Example 3 | Hexagonal pyramid-shaped | 90 | 0.5–1 | 1 | 1.7 | 4.8 | 2.5 | 90 | 0.2 | 0.01 | 0.01 | 0.03 | 480 |

The area rate A, the grain size and the content S were determined in the same manner as in section (Ia) above. The O content was determined in the same manner as in section (Ia); the H and C contents were determined in the same manner as in section (IIa), and the B content was determined in the same manner as in the third embodiment.

As is apparent from the comparison of the examples 1 to 3 in Table 35 with the example 1 in Table 32, if the H content and/or the C content are set in ranges of H≧0.01% by weight and C≧0.03% by weight when O≧0.2% by weight and B≧0.01% by weight, the hardness is increased more than that of the slide surface construction which does not contain hydrogen (H) and/or carbon (C).

has a seizure resistance superior to the example 1 containing oxygen (O), boron (B) and hydrogen (H), and the seizure generating load for the example 3 containing oxygen (O), boron (B), hydrogen (H) and carbon (C) is the highest.

Of course, it is required that the area rate A of the hexagonal pyramid-shaped Fe crystals in the slide surface is in a range of A≧40% even with the slide surface construction containing oxygen (O), boron (B), and at least one of hydrogen (H) and carbon (C), as described above.

(IVb) Slide surface construction containing phosphorus (P), boron (B), and at one least hydrogen (H) and carbon (C)

A plurality of piston pins 1 for an internal combustion engine were produced by subjecting an outer peripheral surface 3 of a pipe-like substrate 2 made of a steel (JIS SCM420) to an electrolytic Fe-plating process to form a slide surface construction 4 formed of an aggregate of Fe crystals and having a thickness of 20 μm.

Table 37 shows conditions for the electrolytic Fe-plating process for examples 1 to 3 of the slide surface constructions 4. The plating time was varied within a range of 10 to 60 minutes in order to set the thickness of the examples 1 to 3 at 20 μm, as described above. The amount of liquid replenisher supplied was set at 0.5 liters/min.

providing the results given in Table 39. Conditions for the seizure test are identical to those described in section (Ia).

TABLE 39

| Slide surface construction | Seizure generating load (N) |
| --- | --- |
| Example 1 | 2300 |
| Example 2 | 2450 |
| Example 3 | 2600 |

TABLE 37

| Slide surface construction | Plating bath | | | | | Pulse current process | | | |
| --- | --- | --- | --- | --- | --- | --- | --- | --- | --- |
| | Composition (g/liter) | | | | Temperature (°C.) | CDmax (A/dm²) | CDm (A/dm²) | $T_{ON}/T_C$ | $T_{ON}$ (msec) |
| | Ferrous sulfate | Sodium hypo-phosphite | Saccharine | Boric Acid   pH | | | | | |
| Example 1 | 400 | 0.8 | 0 | 1.5   6.3 | 48 | 20 | 4 | 0.2 | 2 |
| Example 2 | 400 | 0.5 | 0.75 | 1.5   6.3 | 50 | 40 | 8 | 0.2 | 2 |
| Example 3 | 400 | 0.5 | 0.75 | 1.5   6.3 | 48 | 40 | 8 | 0.2 | 2 |

Table 38 shows the crystal form of the slide surface, the area rate A and grain size of the hexagonal pyramid-shaped Fe crystals in the slide surface, the content (amount present) S of the oriented Fe crystals, the P content, the B content, the H content, the C content, and the hardness of the section of the slide surface construction for the examples 1 to 3 of the slide surface constructions.

Figure 28:
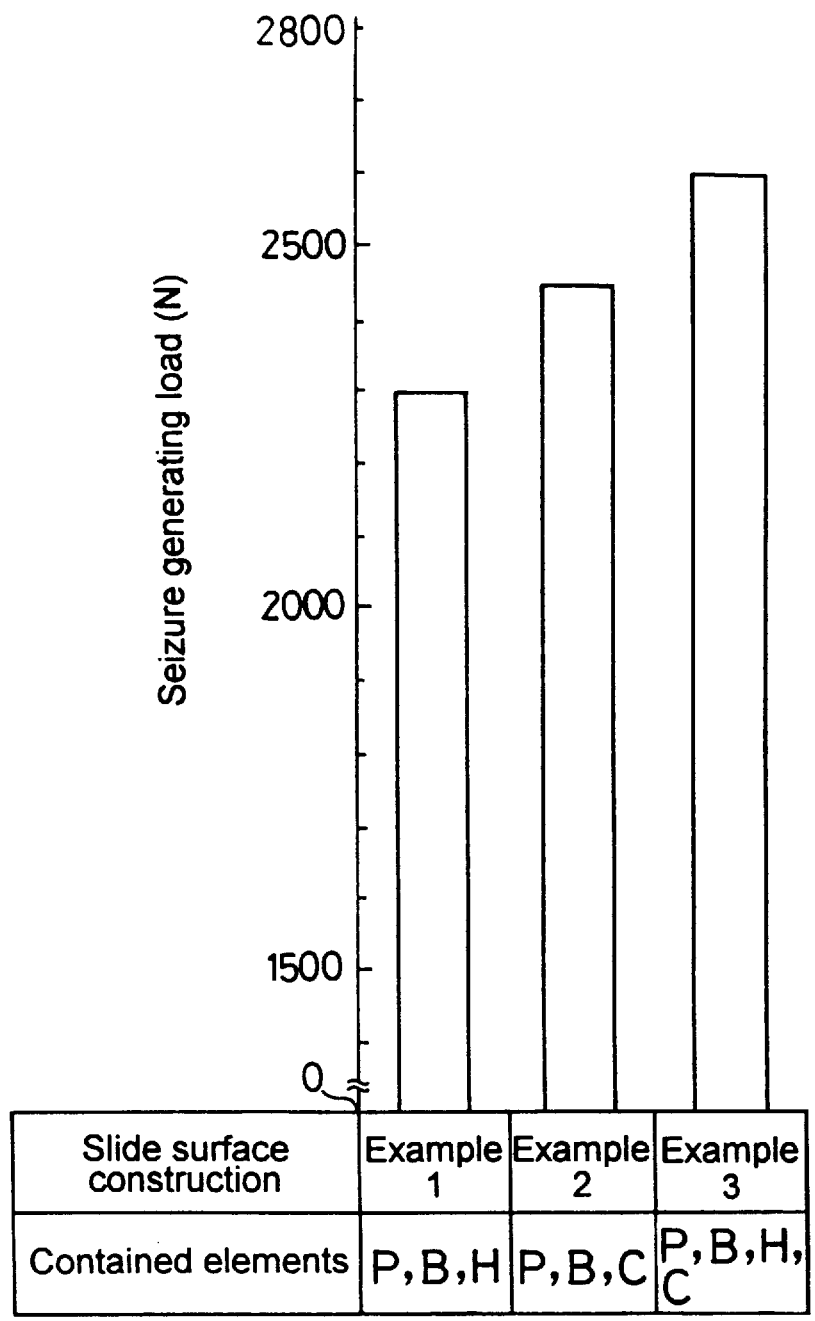
FIG. 28 is a graph illustrating a sixth example of the relationship between elements contained and the seizure generating load.

FIG. 28 is a graph illustrating the relationship between the contained elements and the seizure generating load for the examples 1 to 3. As apparent from Table 39 and FIG. 28, the seizure generating load for the examples 1 to 3 is largely increased with an increase in hardness, as described above, as compared with the example 1 in Table 33. In addition, the example 2 containing phosphorus (P), boron (B) and carbon

TABLE 38

| Slide surface construction | Crystal form of slide surface | Hexagonal pyramid-shaped Fe crystals | | Content S (%) of oriented Fe crystals | | | | | P content (% by weight) | B content (% by weight) | H content (% by weight) | C content (% by weight) | Hardness HmV |
| --- | --- | --- | --- | --- | --- | --- | --- | --- | --- | --- | --- | --- | --- |
| | | Area rate A (%) | Grain size (μm) | {110} | {200} | {211} | {310} | {222} | | | | | |
| Example 1 | Hexagonal pyramid-shaped | 90 | 0.5–3 | 3 | 0.3 | 4.5 | 1.8 | 90.4 | 0.04 | 0.01 | 0.01 | very small | 455 |
| Example 2 | Hexagonal pyramid-shaped | 90 | 0.5–3 | 2.8 | 0.4 | 4.7 | 1.9 | 90.2 | 0.04 | 0.01 | very small | 0.03 | 465 |
| Example 3 | Hexagonal pyramid-shaped | 90 | 0.5–3 | 2.5 | 0.5 | 5 | 1.7 | 90.3 | 0.04 | 0.01 | 0.01 | 0.03 | 485 |

The area rate A, the grain size and the content S were determined in the same manner as in section (Ia) above. The P content A was determined in the same manner as in section (Ib); the H and C contents were determined in the same manner as in section (IIa), and the B content was determined in the same manner as in the third embodiment.

As is apparent from the comparison of the examples 1 to 3 in Table 38 with the example 2 in Table 32, if the H content and/or the C content are set in ranges of H≧0.01% by weight and C≧0.03% by weight when P≧0.04% by weight and B≧0.01% by weight, the hardness is increased more than that of the slide surface construction which does not contain hydrogen (H) and/or carbon (C).

Then, chips of the examples 1 to 3 were fabricated and subjected to a seizure test in a chip-on-disk manner under lubrication to measure the seizure generating load, thereby (C) has a seizure resistance superior to the example 1 containing phosphorus (2), boron (B) and hydrogen (H), and the seizure generating load for the example 3 containing phosphorus (P), boron (B), hydrogen (H) and carbon (C) is the highest.

Of course, it is required that the area rate A of the hexagonal pyramid-shaped Fe crystals in the slide surface is in a range of A≧40% even with the slide surface construction containing phosphorus (P), boron (B), and at least one of hydrogen (H) and carbon (C), as described above.

(IVc) Slide surface construction containing oxygen (O), phosphorus (P), boron (B), and at least one of hydrogen (H) and carbon (C).

A plurality of piston pins 1 for an internal combustion engine were produced by subjecting an outer peripheral surface 3 of a pipe-like substrate 2 made of a steel (JIS SCM420) to an electrolytic Fe-plating process to form a slide surface construction 4 formed of an aggregate of Fe crystals and having a thickness of 20 μm.

Table 40 shows conditions for the electrolytic Fe-plating process for examples 1 to 3 of the slide surface constructions 4. The plating time was varied within a range of 10 to 60 minutes in order to set the thickness of the examples 1 to 3 at 20 μm, as described above. The amount of liquid replenisher supplied was set at 0.5 liters/min.

is increased more than that of the slide surface construction which does not contain hydrogen (H) and/or carbon (C).

Then, chips of the examples 1 to 3 were fabricated and subjected to a seizure test in a chip-on-disk manner under lubrication to measure the seizure generating load, thereby providing the results given in Table 42. Conditions for the seizure test are identical to those described in section (Ia).

TABLE 40

| Slide surface construction | Plating bath | | | | | | Pulse current process | | | |
|---|---|---|---|---|---|---|---|---|---|---|
| | Composition (g/liter) | | | | | | | | | |
| | Ferrous sulfate | Sodium hypo-phosphite | Saccharine | Boric Acid | pH | Temperature (°C.) | CDmax (A/dm$^2$) | CDm (A/dm$^2$) | $T_{ON}/T_C$ | $T_{ON}$ (msec) |
| Example 1 | 400 | 0.8 | 0 | 1.5 | 6.5 | 45 | 20 | 4 | 0.2 | 2 |
| Example 2 | 400 | 0.5 | 0.75 | 1.5 | 6.5 | 50 | 40 | 8 | 0.2 | 2 |
| Example 3 | 400 | 0.5 | 0.75 | 1.5 | 6.5 | 45 | 40 | 8 | 0.2 | 2 |

Table 41 shows the crystal form of the slide surface, the area rate A and grain size of the hexagonal pyramid-shaped Fe crystals in the slide surface, the content (amount present) S of the oriented Fe crystals, the O content, the P content, the B content, the H content, the C content and the hardness of the section of the slide surface construction for the examples 1 to 3 of the slide surface constructions.

TABLE 41

| Slide surface construction | Crystal form of slide surface | Hexagonal pyramid-shaped Fe crystals | | Content S (%) of oriented Fe crystals | | | | | O content (% by weight) | P content (% by weight) | B content (% by weight) | H content (% by weight) | C content (% by weight) | Hardness HmV |
|---|---|---|---|---|---|---|---|---|---|---|---|---|---|---|
| | | Area rate A (%) | Grain size (μm) | {110} | {200} | {211} | {310} | {222} | | | | | | |
| Example 1 | Hexagonal pyramid-shaped | 90 | 0.5–3 | 2.5 | 0.5 | 4.5 | 1.5 | 91 | 0.2 | 0.04 | 0.01 | 0.01 | very small | 490 |
| Example 2 | Hexagonal pyramid-shaped | 90 | 0.5–2 | 2.3 | 0.5 | 5.1 | 1.9 | 90.2 | 0.2 | 0.04 | 0.01 | very small | 0.03 | 500 |
| Example 3 | Hexagonal pyramid-shaped | 90 | 0.5–2 | 2.3 | 0.7 | 5 | 2 | 90 | 0.2 | 0.04 | 0.01 | 0.01 | 0.03 | 520 |

The area rate A, the grain size and the content S were determined in the same manner as in section (Ia). The O content was determined in the same manner as in section (Ia); the P content was determined in the same manner as in section (Ib); the H and C contents were determined in the same manner as in section (IIa), and the B content was determined in the same manner as in the third embodiment.

As is apparent from the comparison of the examples 1 to 3 in Table 41 with the example 3 in Table 32, if the H content and/or the C content are set in ranges of H≧0.01% by weight and C≧0.03% by weight when O≧0.2% by weight; P≧0.04% by weight and B≧0.01% by weight, the hardness

TABLE 42

| Slide surface construction | Seizure generating load (N) |
|---|---|
| Example 1 | 2700 |
| Example 2 | 2850 |
| Example 3 | 3000 |

Figure 29:
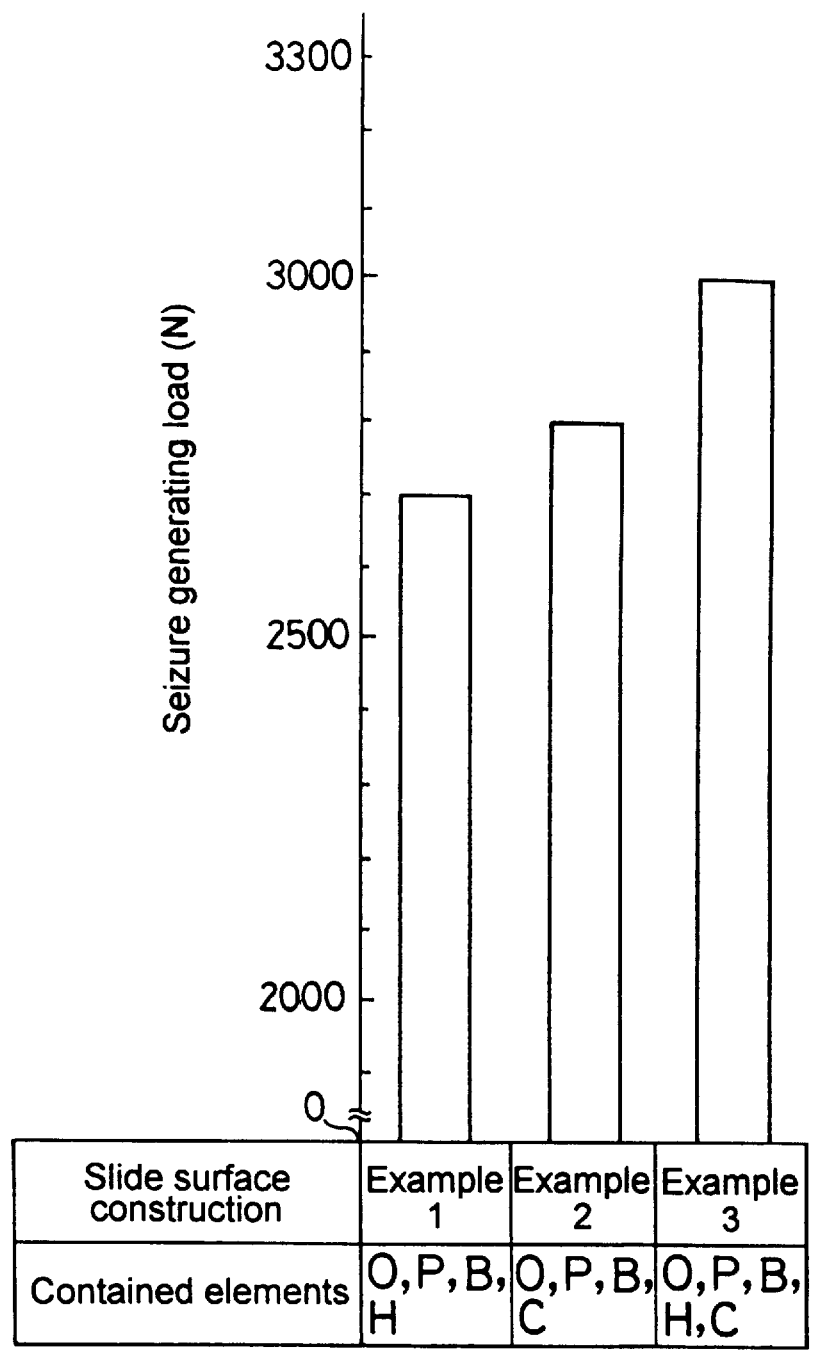
FIG. 29 is a graph illustrating a seventh example of the relationship between elements contained and the seizure generating load.

FIG. 29 is a graph illustrating the relationship between the contained elements and the seizure generating load for the

What is claimed is:

1. A slide surface construction, which is formed of an aggregate of metal crystals, wherein the area rate A of pyramid-shaped metal crystals in the slide surface is in a range of A≧40%, and said aggregate contains phosphorous (P) in a content greater than or equal to 0.04% by weight and, optionally, oxygen (O) in a content greater than or equal to 0.2% by weight.

2. A slide surface construction, which is formed on an aggregate of metal crystals, wherein the area rate A of pyramid-shaped metal crystals in the slide surface is in a range of A≧40%, and said aggregate contains phosphorous (P), at least one of hydrogen (H) and carbon (C), and, optionally, oxygen (O), the O content being greater than or equal to 0.2% by weight, the P content being greater than or equal to 0.04% by weight, the H content being greater than or equal to 0.01% by weight, and the C content being greater than or equal to 0.03% by weight.

3. A slide surface construction, which is formed of an aggregate of metal crystals, wherein said aggregate includes a large number of columnar metal crystals which are grown from a substrate and whose tip ends are formed of pyramid-shaped metal crystals, the area rate A of said pyramid-shaped metal crystals in the slide surface being in a range of A≧40%, and said aggregate contains boron (B), phosphorous (P) and optionally, oxygen (O), the B content being greater than or equal to 0.01% by weight, the O content being greater than or equal to 0.2% by weight, and the P content being greater than or equal to 0.04% by weight.

4. A slide surface construction, which is formed of an aggregate of metal crystals, wherein said aggregate includes a large number of columnar metal crystals which are grown from a substrate and whose tip ends are formed of pyramid-shaped metal crystals, the area rate A of said pyramid-shaped metal crystals in the slide surface being in a range of A≧40%, and said aggregate contains boron (B), phosphorous (P), at least one of hydrogen (H) and carbon (C), and, optionally, oxygen (O), the B content being greater than or equal to 0.01% by weight, the O content being greater than or equal to 0.01% by weight, and the C content being greater than or equal to 0.03% by weight.

5. A slide surface construction according to claim 1, 2, 3 or 4, wherein each said metal crystal has a body-centered cubic structure, and each said pyramid-shaped metal crystal is either an (hhh) oriented metal crystal with its (hhh) planes by Miller indices oriented toward the slide surface or a (2hhh) oriented metal crystal with its (2hhh) planes by Miller indices oriented toward the slide surface.

6. A slide surface construction according to claim 1, 2, 3, or 4, wherein each said metal crystal is an Fe crystal, and each said pyramid-shaped metal crystal is a hexagonal pyramid-shaped (hhh) oriented Fe crystal with its (hhh) planes by Miller indices oriented toward the slide surface.

7. A slide surface construction according to claim 5, wherein each said metal crystal is an Fe crystal, and each said pyramid-shaped metal crystal is a hexagonal pyramid-shaped (hhh) oriented Fe crystal with its (hhh) planes by Miller indices oriented toward the slide surface.

8. A slide surface construction, which is formed of an aggregate of metal crystals, wherein the area rate A of pyramid-shaped metal crystals in the slide surface is in a range of A≧40%, and said aggregate contains phosphorous (P), at least one of boron (B), hydrogen (H) and carbon (C), and, optionally, oxygen (O), the O content being greater than or equal to 0.2% by weight, the P content being greater than or equal to 0.04% by weight, the B content being greater than or equal to 0.01% by weight, the H content being greater than or equal to 0.01% by weight, and the C content being greater than or equal to 0.03% by weight.

9. A slide surface construction according to claim 8, wherein each said metal crystal has a body-centered cubic structure, and each said pyramid-shaped metal crystal is either an (hhh) oriented metal crystal with its (hhh) planes by Miller indices oriented toward the slide surface or a (2hhh) oriented metal crystal with its (2hhh) planes by Miller indices oriented toward the slide surface.

10. A slide surface construction according to claim 8, wherein each said metal crystals is an Fe crystal, and each said pyramid-shaped metal crystal is a hexagonal pyramid-shaped (hhh) oriented Fe crystal with its (hhh) planes by Miller indices oriented toward the slide surface.

11. A slide surface construction, which is formed of an aggregate of metal crystals, wherein the area rate A of pyramid-shaped metal crystals in the slide surface is in a range of A≧40%, and said aggregate contains oxygen (O), phosphorous (P), boron (B), hydrogen (H) and carbon (C), the O content being greater than or equal to 0.2% by weight, the P content being greater than or equal to 0.04% by weight, the B content being greater than or equal to 0.01% by weight, the H content being greater than or equal to 0.01% by weight, and the C content being greater than or equal to 0.03% by weight.

12. A slide surface construction according to claim 1, 2, 3, 4 or 8, wherein the O content is ≧22.9% by weight.

13. A slide surface construction according to claim 1, 2, 3, 4 or 8, wherein the P content is ≧11.5% by weight.

14. A slide surface construction according to claim 2, 4 or 8, wherein the H content is ≧0.1% by weight.

15. A slide surface construction according to claim 2, 4 or 8, wherein the C content is ≧0.8% by weight.

16. A slide surface construction according to claim 3, 4 or 8, wherein the B content is ≧3.7% by weight.

17. A slide surface construction according to claim 8 or 11, wherein the O content is ≧22.9% by weight, the P content is ≧11.5% by weight, the H content is ≧0.1% by weight, the C content is ≧0.8% by weight, and the B content is ≧3.7% by weight.

* * * * *